US010370960B2

(12) United States Patent
Orban

(10) Patent No.: US 10,370,960 B2
(45) Date of Patent: Aug. 6, 2019

(54) REDUCING ELECTROMAGNETIC NOISE DETECTED IN SURFACE MEASUREMENTS

(71) Applicant: Schlumberger Technology Corporation, Houston, TX (US)

(72) Inventor: Jacques Orban, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 10 days.

(21) Appl. No.: 14/982,440

(22) Filed: Dec. 29, 2015

(65) Prior Publication Data
US 2017/0183957 A1 Jun. 29, 2017

(51) Int. Cl.
*H02P 27/04* (2016.01)
*E21B 47/12* (2012.01)
*H02P 27/06* (2006.01)
*E21B 47/06* (2012.01)
*E21B 47/00* (2012.01)
*H02P 27/08* (2006.01)
*H02P 27/00* (2006.01)

(52) U.S. Cl.
CPC ............ *E21B 47/122* (2013.01); *H02P 27/04* (2013.01); *H02P 27/06* (2013.01); *E21B 47/00* (2013.01); *E21B 47/06* (2013.01); *E21B 47/065* (2013.01); *H02P 27/00* (2013.01); *H02P 27/08* (2013.01); *H02P 27/085* (2013.01)

(58) Field of Classification Search
CPC ........ H02P 27/00; H02P 27/04; H02P 27/045; H02P 27/047; H02P 27/06; H02P 27/08; H02P 27/085

USPC ........................................................ 340/855.4
See application file for complete search history.

(56) References Cited

U.S. PATENT DOCUMENTS

| 4,066,938 A * | 1/1978 | Turnbull ................. H02P 23/08 318/721 |
| 6,075,717 A * | 6/2000 | Kumar ................ H02M 5/4505 363/128 |
| 6,414,455 B1 * | 7/2002 | Watson .................... F04B 47/02 318/432 |
| 2004/0160201 A1 * | 8/2004 | Rahman .................. H02P 23/06 318/41 |
| 2005/0242003 A1 | 11/2005 | Scott et al. |
| 2005/0242758 A1 * | 11/2005 | Edelson .................... H02K 3/28 318/376 |
| 2010/0259268 A1 * | 10/2010 | Zhang ...................... G01V 3/28 324/339 |
| 2011/0125451 A1 * | 5/2011 | Cheifetz .................... F24J 3/08 702/130 |
| 2012/0043922 A1 | 2/2012 | Jackson et al. |

(Continued)

FOREIGN PATENT DOCUMENTS

JP 2005-051900 A 2/2005
KR 10-2012-0013017 A 2/2012

*Primary Examiner* — Benyam Haile
(74) *Attorney, Agent, or Firm* — Rachel Greene

(57) ABSTRACT

A method for reducing noise at a wellsite includes transmitting a plurality of first signals from a variable frequency drive (VFD) to an alternating current (AC) induction motor. A timing of a plurality of second signals is varied to control transistors in an inverter of the VFD, thereby reducing harmonic distortion of the first signals output from the VFD. The timing is varied based at least partially upon an estimation of the harmonic distortion.

1 Claim, 16 Drawing Sheets

(56) References Cited

U.S. PATENT DOCUMENTS

| | | | |
|---|---|---|---|
| 2014/0232309 A1* | 8/2014 | Zhou | H02P 27/08 318/400.02 |
| 2015/0252661 A1 | 9/2015 | Glass | |
| 2016/0164448 A1* | 6/2016 | Kane | H02P 27/06 318/400.24 |

* cited by examiner

REDUCING ELECTROMAGNETIC NOISE DETECTED IN SURFACE MEASUREMENTS

BACKGROUND

Drilling rigs may include alternating current ("AC") 3-phase induction motors. The speed of the motors may be controlled using variable frequency drives ("VFDs"). Each VFD may include one or more inverters, and the inverters may generate AC current having a controlled frequency due to pulse-width modulation ("PWM") of one or more insulated-gate bipolar transistors ("IGBTs") in the VFD. The current transmitted from the VFDs to the motors generates noise. More particularly, when the inverters in the VFDs are not synchronized, the switching of the IGBTs in different VFDs is not in phase, which generates the noise. The noise may also be due to harmonics generated by switching the IGBTs of the VFD inverter or diodes/thyristors of the VFD rectifier, resonances generated by switching the IGBTs or thyristors, or a combination thereof. The noise may also be due to intermodulation between multiple signals of similar frequency content, or the interaction of multiple drives on the same input direct current ("DC") power filter.

The noise may interfere with measurements performed at the surface. For example, the noise may interfere with sensing electromagnetic ("EM") telemetry signals that are transmitted to the surface from a downhole tool in a wellbore.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A method for reducing noise at a wellsite is disclosed. The method includes transmitting a plurality of first signals from a variable frequency drive (VFD) to an alternating current (AC) induction motor. A timing of a plurality of second signals is varied to control transistors in an inverter of the VFD, thereby reducing harmonic distortion of the first signals output from the VFD. The timing is varied based at least partially upon an estimation of the harmonic distortion.

In another embodiment, the method includes transmitting an electromagnetic signal from a downhole tool in a wellbore to a sensing element at a surface location. The sensing element includes stakes in the ground. An output of the sensing element is analyzed during a first time period when a drive signal is transmitted and the electromagnetic signal is transmitted, and during a second time period when the drive signal is transmitted and the electromagnetic signal is not transmitted. The drive signal is transmitted from a variable frequency drive to a motor. The drive signal is varied, in response to analyzing the output, to reduce noise in the output. The noise includes a portion of the output related to the drive signal.

A system for reducing noise at a wellsite is also disclosed. The system includes a motor and a variable frequency drive that transmits a drive signal to the motor to control a speed of the motor. The system also includes a sensing element that receives at least a portion of the drive signal and receives an electromagnetic signal transmitted from a downhole tool in a wellbore. A computing system analyzes an output of the sensing element during a first time period when the drive signal is transmitted and the electromagnetic signal is transmitted, and during a second time period when the drive signal is transmitted and the electromagnetic signal is not transmitted. The computing system also varies the drive signal, in response the analyzed output, to reduce noise in the output. The noise includes a portion of the output related to the drive signal.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 8-1 and 8-2 illustrate graphs showing the phase of the AC signal applied to different motors being shifted, according to an embodiment.

DETAILED DESCRIPTION

Reference will now be made in detail to specific embodiments illustrated in the accompanying drawings and figures. In the following detailed description, numerous specific details are set forth in order to provide a thorough understanding of the invention. However, it will be apparent to one of ordinary skill in the art that embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object or step, and, similarly, a second object could be termed a first object or step, without departing from the scope of the present disclosure.

The terminology used in the description of the invention herein is for the purpose of describing particular embodiments only and is not intended to be limiting. As used in the description of the invention and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Figure 1:
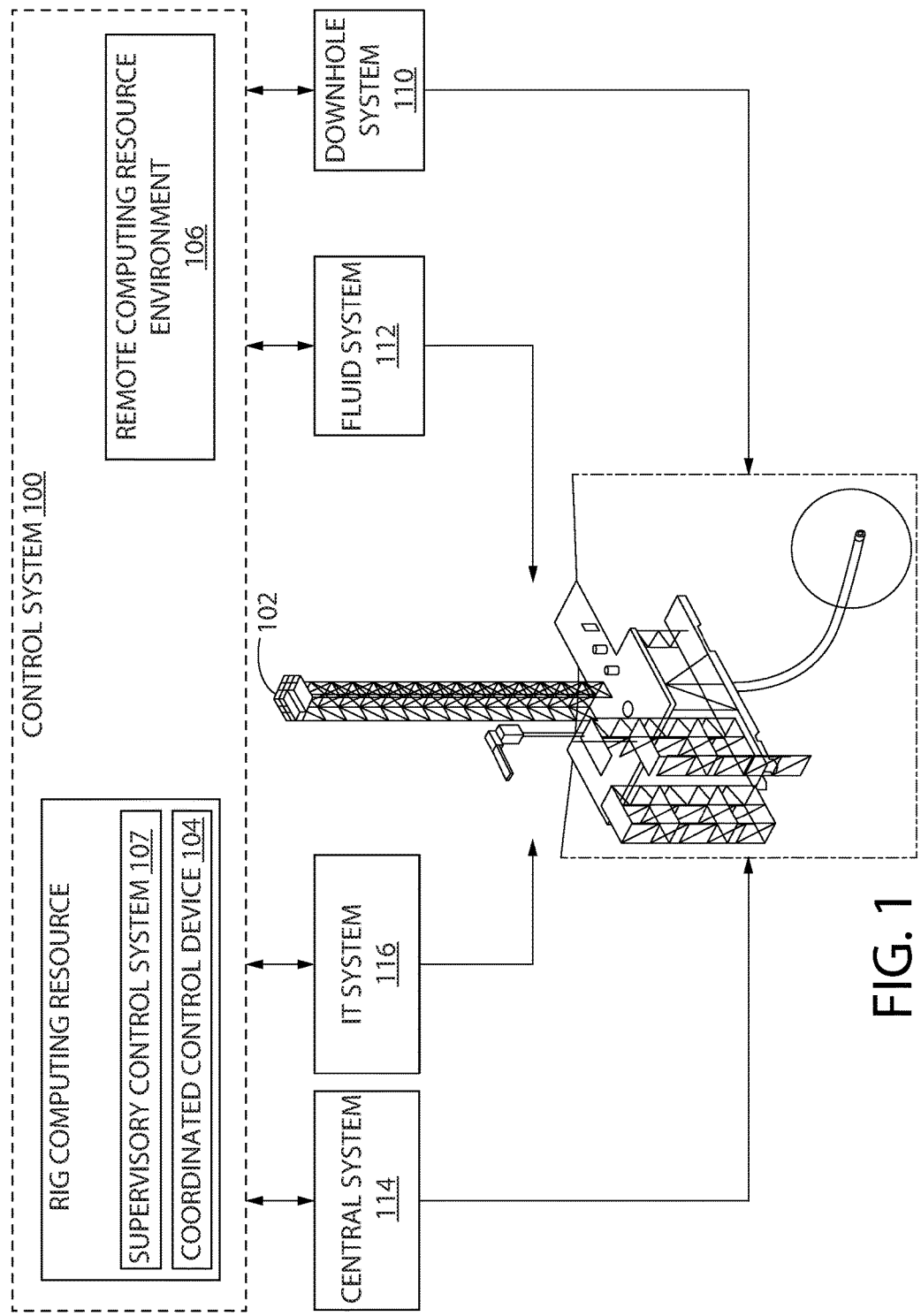
FIG. 1 illustrates a conceptual, schematic view of a control system for a drilling rig, according to an embodiment.

FIG. 1 illustrates a conceptual, schematic view of a control system 100 for a drilling rig 102, according to an embodiment. The control system 100 may include a rig computing resource environment 105, which may be located onsite at the drilling rig 102 and, in some embodiments, may have a coordinated control device 104. The control system 100 may also provide a supervisory control system 107. In some embodiments, the control system 100 may include a remote computing resource environment 106, which may be located offsite from the drilling rig 102.

The remote computing resource environment 106 may include computing resources locating offsite from the drilling rig 102 and accessible over a network. A "cloud" computing environment is one example of a remote computing resource. The cloud computing environment may communicate with the rig computing resource environment 105 via a network connection (e.g., a WAN or LAN connection). In some embodiments, the remote computing resource environment 106 may be at least partially located onsite, e.g., allowing control of various aspects of the drilling rig 102 onsite through the remote computing resource environment 105 (e.g., via mobile devices). Accordingly, "remote" should not be limited to any particular distance away from the drilling rig 102.

Further, the drilling rig 102 may include various systems with different sensors and equipment for performing operations of the drilling rig 102, and may be monitored and controlled via the control system 100, e.g., the rig computing resource environment 105. Additionally, the rig computing resource environment 105 may provide for secured access to rig data to facilitate onsite and offsite user devices monitoring the rig, sending control processes to the rig, and the like.

Various example systems of the drilling rig 102 are depicted in FIG. 1. For example, the drilling rig 102 may include a downhole system 110, a fluid system 112, and a central system 114. These systems 110, 112, 114 may also be examples of "subsystems" of the drilling rig 102, as described herein. In some embodiments, the drilling rig 102 may include an information technology (IT) system 116. The downhole system 110 may include, for example, a bottom-hole assembly (BHA), mud motors, sensors, etc. disposed along the drill string, and/or other drilling equipment configured to be deployed into the wellbore. Accordingly, the downhole system 110 may refer to tools disposed in the wellbore, e.g., as part of the drill string used to drill the well.

The fluid system 112 may include, for example, drilling mud, pumps, valves, cement, mud-loading equipment, mud-management equipment, pressure-management equipment, separators, and other fluids equipment. Accordingly, the fluid system 112 may perform fluid operations of the drilling rig 102.

The central system 114 may include a hoisting and rotating platform, top drives, rotary tables, kellys, drawworks, pumps, generators, tubular handling equipment, derricks, masts, substructures, and other suitable equipment. Accordingly, the central system 114 may perform power generation, hoisting, and rotating operations of the drilling rig 102, and serve as a support platform for drilling equipment and staging ground for rig operation, such as connection make up, etc. The IT system 116 may include software, computers, and other IT equipment for implementing IT operations of the drilling rig 102.

The control system 100, e.g., via the coordinated control device 104 of the rig computing resource environment 105, may monitor sensors from multiple systems of the drilling rig 102 and provide control commands to multiple systems of the drilling rig 102, such that sensor data from multiple systems may be used to provide control commands to the different systems of the drilling rig 102. For example, the system 100 may collect temporally and depth aligned surface data and downhole data from the drilling rig 102 and store the collected data for access onsite at the drilling rig 102 or offsite via the rig computing resource environment 105. Thus, the system 100 may provide monitoring capability. Additionally, the control system 100 may include supervisory control via the supervisory control system 107.

In some embodiments, one or more of the downhole system 110, fluid system 112, and/or central system 114 may be manufactured and/or operated by different vendors. In such an embodiment, certain systems may not be capable of unified control (e.g., due to different protocols, restrictions on control permissions, safety concerns for different control systems, etc.). An embodiment of the control system 100 that is unified, may, however, provide control over the drilling rig 102 and its related systems (e.g., the downhole system 110, fluid system 112, and/or central system 114, etc.). Further, the downhole system 110 may include one or a plurality of downhole systems. Likewise, fluid system 112, and central system 114 may contain one or a plurality of fluid systems and central systems, respectively.

In addition, the coordinated control device 104 may interact with the user device(s) (e.g., human-machine interface(s)) 118, 120. For example, the coordinated control device 104 may receive commands from the user devices 118, 120 and may execute the commands using two or more of the rig systems 110, 112, 114, e.g., such that the operation of the two or more rig systems 110, 112, 114 act in concert and/or off-design conditions in the rig systems 110, 112, 114 may be avoided.

Figure 2:
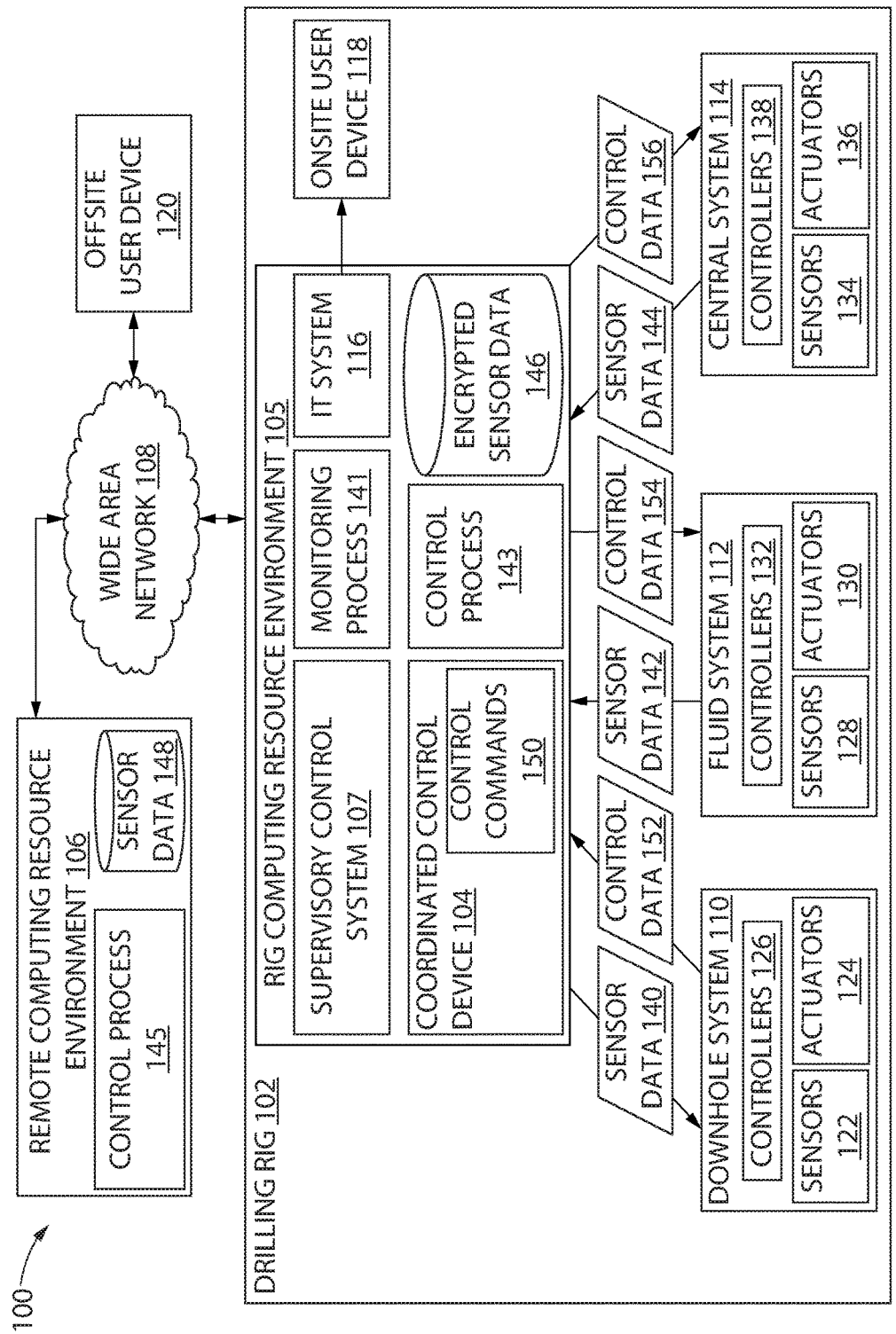
FIG. 2 illustrates a conceptual, schematic view of the control system, according to an embodiment.

FIG. 2 illustrates a conceptual, schematic view of the control system 100, according to an embodiment. The rig computing resource environment 105 may communicate with offsite devices and systems using a network 108 (e.g., a wide area network (WAN) such as the internet). Further, the rig computing resource environment 105 may communicate with the remote computing resource environment 106 via the network 108. FIG. 2 also depicts the aforementioned example systems of the drilling rig 102, such as the downhole system 110, the fluid system 112, the central system 114, and the IT system 116. In some embodiments, one or more onsite user devices 118 may also be included on the drilling rig 102. The onsite user devices 118 may interact with the IT system 116. The onsite user devices 118 may include any number of user devices, for example, stationary user devices intended to be stationed at the drilling rig 102 and/or portable user devices. In some embodiments, the onsite user devices 118 may include a desktop, a laptop, a smartphone, a personal data assistant (PDA), a tablet component, a wearable computer, or other suitable devices. In some embodiments, the onsite user devices 118 may communicate with the rig computing resource environment 105 of the drilling rig 102, the remote computing resource environment 106, or both.

One or more offsite user devices 120 may also be included in the system 100. The offsite user devices 120 may include a desktop, a laptop, a smartphone, a personal data assistant (PDA), a tablet component, a wearable computer, or other suitable devices. The offsite user devices 120 may be configured to receive and/or transmit information (e.g., monitoring functionality) from and/or to the drilling rig 102 via communication with the rig computing resource environment 105. In some embodiments, the offsite user devices 120 may provide control processes for controlling operation of the various systems of the drilling rig 102. In some embodiments, the offsite user devices 120 may communicate with the remote computing resource environment 106 via the network 108.

The user devices 118 and/or 120 may be examples of a human-machine interface. These devices 118, 120 may allow feedback from the various rig subsystems to be displayed and allow commands to be entered by the user. In various embodiments, such human-machine interfaces may be onsite or offsite, or both.

The systems of the drilling rig 102 may include various sensors, actuators, and controllers (e.g., programmable logic controllers (PLCs)), which may provide feedback for use in the rig computing resource environment 105. For example, the downhole system 110 may include sensors 122, actuators 124, and controllers 126. The fluid system 112 may include sensors 128, actuators 130, and controllers 132. Additionally, the central system 114 may include sensors 134, actuators 136, and controllers 138. The sensors 122, 128, and 134 may include any suitable sensors for operation of the drilling rig 102. In some embodiments, the sensors 122, 128, and 134 may include a camera, a pressure sensor, a temperature sensor, a flow rate sensor, a vibration sensor, a current sensor, a voltage sensor, a resistance sensor, a gesture detection sensor or device, a voice actuated or recognition device or sensor, or other suitable sensors.

The sensors described above may provide sensor data feedback to the rig computing resource environment 105 (e.g., to the coordinated control device 104). For example, downhole system sensors 122 may provide sensor data 140, the fluid system sensors 128 may provide sensor data 142, and the central system sensors 134 may provide sensor data 144. The sensor data 140, 142, and 144 may include, for example, equipment operation status (e.g., on or off, up or down, set or release, etc.), drilling parameters (e.g., depth, hook load, torque, etc.), auxiliary parameters (e.g., vibration data of a pump) and other suitable data. In some embodiments, the acquired sensor data may include or be associated with a timestamp (e.g., a date, time or both) indicating when the sensor data was acquired. Further, the sensor data may be aligned with a depth or other drilling parameter.

Acquiring the sensor data into the coordinated control device 104 may facilitate measurement of the same physical properties at different locations of the drilling rig 102. In some embodiments, measurement of the same physical properties may be used for measurement redundancy to enable continued operation of the well. In yet another embodiment, measurements of the same physical properties at different locations may be used for detecting equipment conditions among different physical locations. In yet another embodiment, measurements of the same physical properties using different sensors may provide information about the relative quality of each measurement, resulting in a "higher" quality measurement being used for rig control, and process applications. The variation in measurements at different locations over time may be used to determine equipment performance, system performance, scheduled maintenance due dates, and the like. Furthermore, aggregating sensor data from each subsystem into a centralized environment may enhance drilling process and efficiency. For example, slip status (e.g., in or out) may be acquired from the sensors and provided to the rig computing resource environment 105, which may be used to define a rig state for automated control. In another example, acquisition of fluid samples may be measured by a sensor and related with bit depth and time measured by other sensors. Acquisition of data from a camera sensor may facilitate detection of arrival and/or installation of materials or equipment in the drilling rig 102. The time of arrival and/or installation of materials or equipment may be used to evaluate degradation of a material, scheduled maintenance of equipment, and other evaluations.

The coordinated control device 104 may facilitate control of individual systems (e.g., the central system 114, the downhole system, or fluid system 112, etc.) at the level of each individual system. For example, in the fluid system 112, sensor data 128 may be fed into the controller 132, which may respond to control the actuators 130. However, for control operations that involve multiple systems, the control may be coordinated through the coordinated control device 104. Examples of such coordinated control operations include the control of downhole pressure during tripping. The downhole pressure may be affected by both the fluid system 112 (e.g., pump rate and choke position) and the central system 114 (e.g. tripping speed). When it is desired to maintain certain downhole pressure during tripping, the coordinated control device 104 may be used to direct the appropriate control commands. Furthermore, for mode based controllers which employ complex computation to reach a control setpoint, which are typically not implemented in the subsystem PLC controllers due to complexity and high computing power demands, the coordinated control device 104 may provide the adequate computing environment for implementing these controllers.

In some embodiments, control of the various systems of the drilling rig 102 may be provided via a multi-tier (e.g., three-tier) control system that includes a first tier of the controllers 126, 132, and 138, a second tier of the coordinated control device 104, and a third tier of the supervisory control system 107. The first tier of the controllers may be responsible for safety critical control operation, or fast loop feedback control. The second tier of the controllers may be responsible for coordinated controls of multiple equipment or subsystems, and/or responsible for complex model based controllers. The third tier of the controllers may be responsible for high level task planning, such as to command the rig system to maintain certain bottom hole pressure. In other embodiments, coordinated control may be provided by one or more controllers of one or more of the drilling rig systems 110, 112, and 114 without the use of a coordinated control device 104. In such embodiments, the rig computing resource environment 105 may provide control processes directly to these controllers for coordinated control. For example, in some embodiments, the controllers 126 and the controllers 132 may be used for coordinated control of multiple systems of the drilling rig 102.

The sensor data 140, 142, and 144 may be received by the coordinated control device 104 and used for control of the drilling rig 102 and the drilling rig systems 110, 112, and 114. In some embodiments, the sensor data 140, 142, and 144 may be encrypted to produce encrypted sensor data 146. For example, in some embodiments, the rig computing resource environment 105 may encrypt sensor data from different types of sensors and systems to produce a set of encrypted sensor data 146. Thus, the encrypted sensor data 146 may not be viewable by unauthorized user devices (either offsite or onsite user device) if such devices gain access to one or more networks of the drilling rig 102. The sensor data 140, 142, 144 may include a timestamp and an aligned drilling parameter (e.g., depth) as discussed above. The encrypted sensor data 146 may be sent to the remote computing resource environment 106 via the network 108 and stored as encrypted sensor data 148.

The rig computing resource environment 105 may provide the encrypted sensor data 148 available for viewing and processing offsite, such as via offsite user devices 120. Access to the encrypted sensor data 148 may be restricted via access control implemented in the rig computing resource environment 105. In some embodiments, the encrypted sensor data 148 may be provided in real-time to offsite user devices 120 such that offsite personnel may view real-time status of the drilling rig 102 and provide feedback based on the real-time sensor data. For example, different portions of the encrypted sensor data 146 may be sent to offsite user devices 120. In some embodiments, encrypted sensor data may be decrypted by the rig computing resource environment 105 before transmission or decrypted on an offsite user device after encrypted sensor data is received.

The offsite user device 120 may include a client (e.g., a thin client) configured to display data received from the rig computing resource environment 105 and/or the remote computing resource environment 106. For example, multiple types of thin clients (e.g., devices with display capability and minimal processing capability) may be used for certain functions or for viewing various sensor data.

The rig computing resource environment 105 may include various computing resources used for monitoring and controlling operations such as one or more computers having a processor and a memory. For example, the coordinated control device 104 may include a computer having a processor and memory for processing sensor data, storing sensor data, and issuing control commands responsive to sensor data. As noted above, the coordinated control device 104 may control various operations of the various systems of the drilling rig 102 via analysis of sensor data from one or more drilling rig systems (e.g. 110, 112, 114) to enable coordinated control between each system of the drilling rig 102. The coordinated control device 104 may execute control commands 150 for control of the various systems of the drilling rig 102 (e.g., drilling rig systems 110, 112, 114). The coordinated control device 104 may send control data determined by the execution of the control commands 150 to one or more systems of the drilling rig 102. For example, control data 152 may be sent to the downhole system 110, control data 154 may be sent to the fluid system 112, and control data 154 may be sent to the central system 114. The control data may include, for example, operator commands (e.g., turn on or off a pump, switch on or off a valve, update a physical property setpoint, etc.). In some embodiments, the coordinated control device 104 may include a fast control loop that directly obtains sensor data 140, 142, and 144 and executes, for example, a control algorithm. In some embodiments, the coordinated control device 104 may include a slow control loop that obtains data via the rig computing resource environment 105 to generate control commands.

In some embodiments, the coordinated control device 104 may intermediate between the supervisory control system 107 and the controllers 126, 132, and 138 of the systems 110, 112, and 114. For example, in such embodiments, a supervisory control system 107 may be used to control systems of the drilling rig 102. The supervisory control system 107 may include, for example, devices for entering control commands to perform operations of systems of the drilling rig 102. In some embodiments, the coordinated control device 104 may receive commands from the supervisory control system 107, process the commands according to a rule (e.g., an algorithm based upon the laws of physics for drilling operations), and/or control processes received from the rig computing resource environment 105, and provides control data to one or more systems of the drilling rig 102. In some embodiments, the supervisory control system 107 may be provided by and/or controlled by a third party. In such embodiments, the coordinated control device 104 may coordinate control between discrete supervisory control systems and the systems 110, 112, and 114 while using control commands that may be optimized from the sensor data received from the systems 110 112, and 114 and analyzed via the rig computing resource environment 105.

The rig computing resource environment 105 may include a monitoring process 141 that may use sensor data to determine information about the drilling rig 102. For example, in some embodiments the monitoring process 141 may determine a drilling state, equipment health, system health, a maintenance schedule, or any combination thereof. Furthermore, the monitoring process 141 may monitor sensor data and determine the quality of one or a plurality of sensor data. In some embodiments, the rig computing resource environment 105 may include control processes 143 that may use the sensor data 146 to optimize drilling operations, such as, for example, the control of drilling equipment to improve drilling efficiency, equipment reliability, and the like. For example, in some embodiments the acquired sensor data may be used to derive a noise cancellation scheme to improve electromagnetic and mud pulse telemetry signal processing. The control processes 143 may be implemented via, for example, a control algorithm, a computer program, firmware, or other suitable hardware and/or software. In some embodiments, the remote computing resource environment 106 may include a control process 145 that may be provided to the rig computing resource environment 105.

The rig computing resource environment 105 may include various computing resources, such as, for example, a single computer or multiple computers. In some embodiments, the rig computing resource environment 105 may include a virtual computer system and a virtual database or other virtual structure for collected data. The virtual computer system and virtual database may include one or more resource interfaces (e.g., web interfaces) that enable the submission of application programming interface (API) calls to the various resources through a request. In addition, each of the resources may include one or more resource interfaces that enable the resources to access each other (e.g., to enable a virtual computer system of the computing resource environment to store data in or retrieve data from the database or other structure for collected data).

The virtual computer system may include a collection of computing resources configured to instantiate virtual machine instances. The virtual computing system and/or computers may provide a human-machine interface through which a user may interface with the virtual computer system via the offsite user device or, in some embodiments, the onsite user device. In some embodiments, other computer systems or computer system services may be utilized in the rig computing resource environment 105, such as a computer system or computer system service that provisions computing resources on dedicated or shared computers/servers and/or other physical devices. In some embodiments, the rig computing resource environment 105 may include a single server (in a discrete hardware component or as a virtual server) or multiple servers (e.g., web servers, application servers, or other servers). The servers may be, for example, computers arranged in any physical and/or virtual configuration In some embodiments, the rig computing resource environment 105 may include a database that may be a collection of computing resources that run one or more data collections. Such data collections may be operated and managed by utilizing API calls. The data collections, such as sensor data, may be made available to other resources in the rig computing resource environment or to user devices (e.g., onsite user device 118 and/or offsite user device 120) accessing the rig computing resource environment 105. In some embodiments, the remote computing resource environment 106 may include similar computing resources to those described above, such as a single computer or multiple computers (in discrete hardware components or virtual computer systems).

Figure 3:
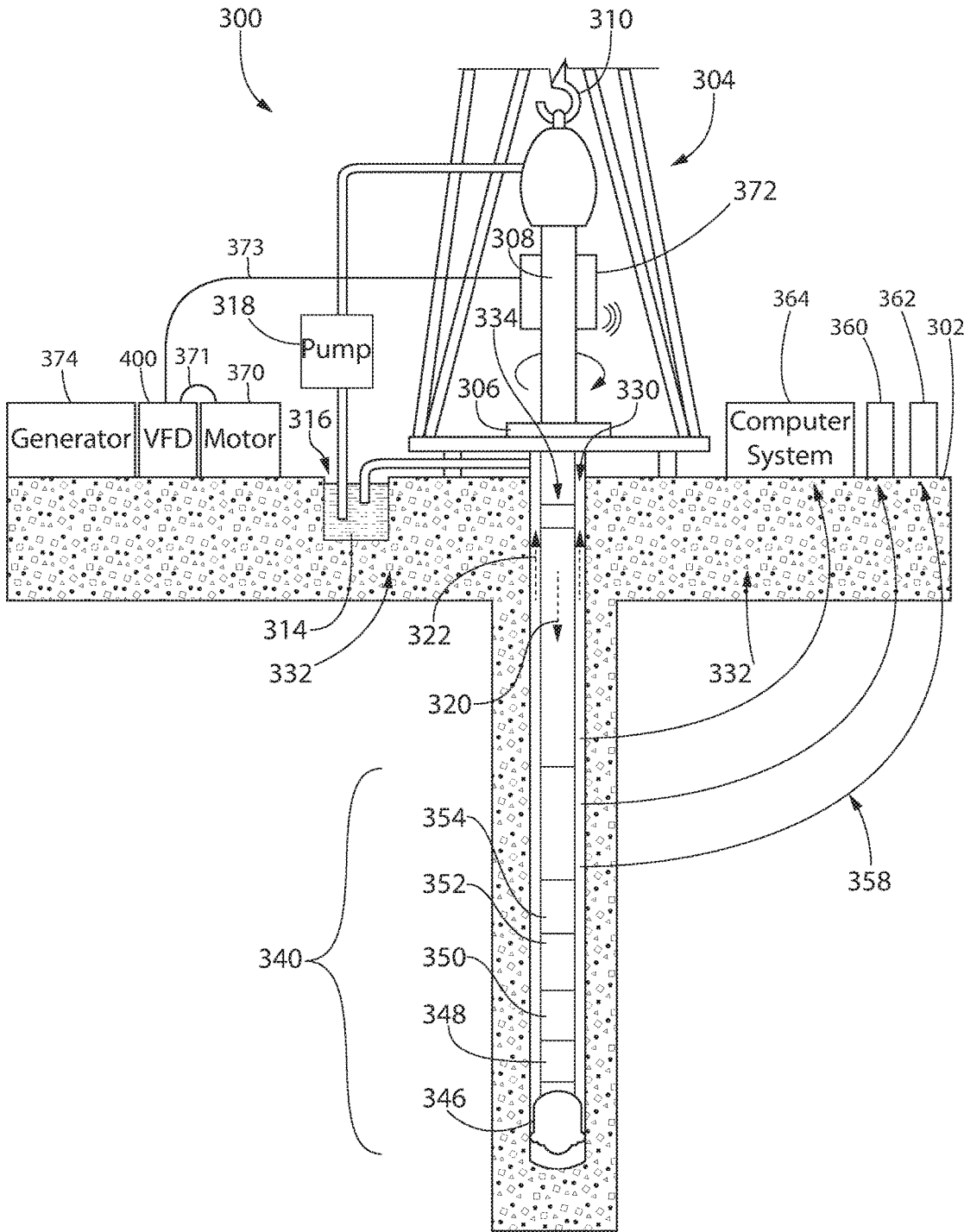
FIG. 3 illustrates a cross-sectional view of a well site system, according to an embodiment.

FIG. 3 illustrates a cross-sectional view of a well site system 300, according to an embodiment. The well site system 300 may include a rig floor supported by the rig sub-structure and derrick assembly 304 positioned over a wellbore 330 that is formed in a subterranean formation 332. The rig sub-structure and derrick assembly 304 may include a rotary table 306, a kelly or top drive 308, and a hook 310. A drill string 334 may be supported by the hook 310 and extend down into the wellbore 330. The drill string 334 may include a body that is a hollow, metallic tubular member. The rotation of the drill string 334 may be generated by the top drive 308. However, the rotary table 306 may optionally generate rotary motion that is transmitted through the kelly.

Drilling fluid or mud 314 may be stored in a pit 316 at the well site. A pump 318 may deliver the drilling fluid 314 to the interior of the drill string 334 via a port in the swivel 312, which causes the drilling fluid 314 to flow downwardly through the drill string 334, as indicated by the directional arrow 320. The drilling fluid exits the drill string 334 via ports in a drill bit 346, and then circulates upwardly through the annulus region between the outside of the drill string 334 and a wall of the wellbore 330, as indicated by the directional arrows 322. In this known manner, the drilling fluid lubricates the drill bit 346 and carries formation cuttings up to the surface 302 as it is returned to the pit 316 for recirculation.

A bottom hole assembly ("BHA") 340 may be coupled to a lower end of the drill string 334. The BHA 340 may be or include several downhole tools above the drill bit 346. The downhole tools may be or include a rotary steerable system ("RSS") 348, a motor 350, one or more logging-while-drilling ("LWD") tools 352, and a measurement-while-drilling ("MWD") tool 354. The LWD tool 352 may be configured to measure one or more formation properties and/or physical properties as the wellbore 330 is being drilled or at any time thereafter. The MWD tool 354 may be configured to measure one or more physical properties as the wellbore 330 is being drilled or at any time thereafter. The formation properties may include resistivity, density, porosity, sonic velocity, gamma rays, and the like. The physical properties may include pressure, temperature, wellbore caliper, wellbore trajectory, a weight-on-bit, torque-on-bit, vibration, shock, stick slip, and the like. The measurements from the LWD tool 352 may be sent to the MWD tool 354. The MWD tool 354 may then group the sets of data from the LWD tool 352 and the MWD tool 354 and prepare the data for transmission to the surface 302 after proper encoding.

The MWD tool 354 may transmit data (e.g., formation properties, physical properties, etc.) from within the wellbore 330 up to a computer system 364 at the surface 302 using electromagnetic telemetry. To transmit the digital data stream from within the wellbore 330 to the surface 302, a coding method may be used. More particularly, a predetermined carrier frequency is selected, and a PSK or QPSK coding is superposed to define the bit pattern. This coded signal is applied as a voltage differential between upper and lower portions of the downhole tool 340 (e.g., across an insulation layer). Due to the voltage differential between the upper and lower portions of the downhole tool 340, a current may be generated that travels from the lower portion of the downhole tool 340 out into the subterranean formation 332. At least a portion of the current 358 may reach the surface 302.

One or more signal detectors (two are shown: 360, 362) may be positioned at the surface 302. As shown, the signal detectors 360, 362 may be metal stakes that are driven into the ground. The signal detector 360, 362 may be laterally-offset from one another by a predetermined distance. The signal detector 360, 362 may be configured to detect part of the current 358 in the subterranean formation 332 and/or a voltage differential between the signal detectors 360, 362. The current and/or voltage differential may be measured at the signal detector 360, 362 by an ADC connected to the signal detectors 360, 362. The output of the ADC may be transmitted to the computer system 364 at the surface 302. By processing of the ADC output, the computer system 364 may then decode the voltage differential to recover the transmitted data by the MWD tool 354 (e.g., the formation properties, physical properties, etc.). In some embodiments, a drilling parameter may be varied in response to receiving and recovering the data. The drilling parameter may be or include the volumetric flow rate of fluid (e.g., drilling mud) being pumped into the wellbore 330, the weight on the drill bit 346 ("WOB"), or the like.

The well site system 300 may also include one or more motors (two are shown: 370, 372) positioned at the surface 302. The first motor 370 may be configured to drive a pump (e.g., pump 318) or other equipment. The second motor 372 may be configured to drive the top drive 308. The speed of the first motor 370 and/or the second motor 372 may be controlled by a VFD 400, as discussed in greater detail below. Electrical cables 371, 373 may extend between the VFD 400 and the motors 370, 372 and transmit electrical signals therebetween. In at least one embodiment, a generator 374 may also be present. An electrical cable 375 may extend between the VFD 400 and the generator 374 and transmit electrical signals therebetween.

The motors 370, 372 may be 3-phase induction motors including a stator with a winding organized in poles to create a rotary magnetic flux. The windings may be connected to corresponding AC phases and are offset from one another by 120 degrees in the stator. Each winding may create a magnetic flux oscillating at the source of power shifted by 120 degrees in the time domain. When combining the three AC magnetic fluxes with respect to their geometrical positions, the resultant magnetic vector may be a rotary vector of constant amplitude.

In one embodiment, the motors 370, 372 may be AC induction motors having a "squirrel cage" rotor. A squirrel cage rotor includes conductive bars encased in steel laminations that are interconnected at their extremities. The AC current in the stator induces a flux variation in the rotor, which generates AC electromotive force ("EMF") in the bars of the squirrel cage. Due to the presence of this EMF, current may be generated in the bars of the squirrel cage. The induced current interacts with the stator flux as a tangential force on the bars. These forces may be combined to generate torque on the rotor.

The motors 370, 372 may have a torque curve that is specific to the drive conditions (e.g., voltage and frequency). The motor torque curve may be characterized by: (1) the locked rotor torque (i.e., the torque available at startup), (2) the break-down torque (i.e., the highest torque that the motors 370, 372 can generate), (3) a free spinning speed (i.e., the synchronization speed) for a zero-torque load, and (4) a motor characteristic that is linear near the synchronization speed. The synchronization speed may directly depend on the frequency of the AC signal applied on the motors 370, 372.

When a load is applied to the motors 370, 372, the intersection between the motor characteristic line and the load line defines the operation point. For proper usage, the torque used to drive the load at the "operation point" may be smaller than the "break-down torque." With such conditions, the motors 370, 372 may operate at a speed that is slightly lower than the "synchronization speed" imposed by the frequency of the AC supply. This may define the "slip," which is the difference between the synchronous speed and the speed under-load.

If the load increases, but stays below the break-down torque, the slip may increase. When the motors 370, 372 are stopped (i.e., without AC power), and AC power is suddenly supplied, the motors 370, 372 may start rotation and accelerate to reach its "operation point." Often this acceleration is quite violent, as the available torque is quite large.

Figure 4:
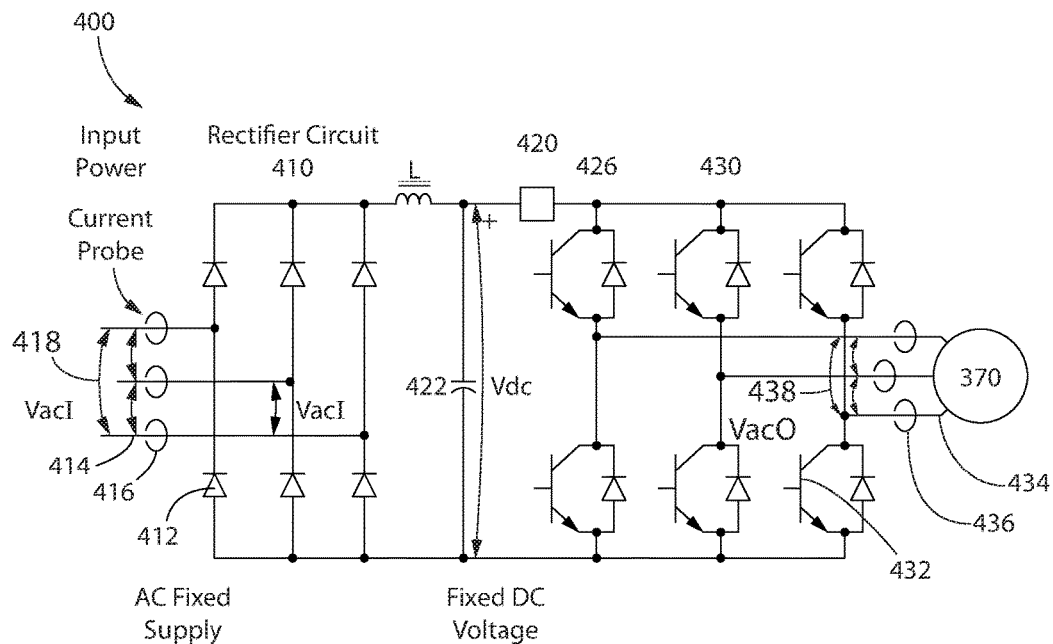
FIG. 4 illustrates a schematic view of a VFD, according to an embodiment.

Varying the AC voltage is one way to regulate the speed of the motor 370. Varying the AC frequency is another way to control the speed of the motor 370. The AC frequency may be varied using the VFD 400. As shown in FIG. 4, the VFD 400 may include a rectifier, a filter, and an inverter. The power may be supplied at constant a frequency and voltage. The rectifier may convert the power into DC power having a constant voltage. The rectifier may include one or more (e.g., six) diodes, or one or more thyristors. When the rectifier includes the diodes, the rectified amplitude may depend on the supplied voltage, which cannot be adjusted. When the rectifier includes thyristors, the rectified voltage may be adjusted by applying a delay on the conduction of the thyristors (e.g., via a drive signal on the thyristor gate).

The inverter may include one or more (e.g. six) transistors that may each be switched between "on" and "off" conditions to generate an approximated sinusoidal output of the desired frequency. The output from the inverter may be an approximated sine wave that has the basic frequency at the desired value to drive the AC induction motor 370, 372 at the desired rotational speed. The generation of the approximated sine wave may be obtained by the proper switching of the transistors (or IGBT) of the inverter. Several switching methods to control the inverter transistors may be applied. However, the output voltage and current (e.g., supplied to the motor) may be distorted. The distorted signal may generate high harmonics (e.g., amplitude and frequency) and a generation of noise. Current noise may radiate as an EM signal from the cables (e.g., cables 371, 373, 375, etc.) and the unshielded devices. Additional current noise may also occur due to direct current leakage to ground. Voltage noise may radiate via capacitive coupling through the insulation of the electrical components.

There may be at least three different types of drives for the inverter. The first drive may be the "6-step" inverter, which includes the six transistors. With such a method, the output sine wave may be approximated by a square wave. This may be accomplished by activating IGBTs once per cycle. The output signal from this drive may contain high harmonics and may generate high EM noise. This drive may also limit the performance of the motors 370, 372. The second drive may be a pulse-width modulation ("PWM") inverter. The transistors are set multiple times in conduction mode per cycle of the output signal. With control of these pulses, the output signal may be closer to a sine wave. The PWM inverter may generate an output (e.g., voltage and current) with fewer harmonics than the 6-step drive. The third drive is referred to as the sine wave drive. This drive method for the transistor also applies multiple conduction periods on the transistor per output cycle. The lengths of these multiple conduction periods are adapted over the single output cycle (see FIG. 5—upper diagram) so that the inverter output is nearly sinusoidal. Such driven inverter may deliver smoother sine wave power to the motor 170 than the first and second drives. Sine wave drive switching sequence may be obtained by mixing a triangular wave with a small amplitude reference sine wave. With such control of the pulse duration, each pulse may provide adequate energy at the output to generate the approximate sine wave signal of the desired amplitude at the desired drive frequency.

The filter section between the rectifier and inverter may reduce the instantaneous load and load variation in the rectifier during the multiple switching of the inverter. For example, one or more capacitors may be used to reduce the ripples in the rectified voltage at the output of the VFD 400.

In the sine wave drive, the transistors may be set in conduction mode multiple times per sine wave and the duration of each "on" and "off" period is adapted during one cycle of the output signal to allow the generation of sine wave with minimum distortion. This defines the base switching sequence for of the transistors for that output cycle. This base switching sequence may then be repeated to generate a continuous AC output. The base switching sequence may be applied for the other phases by applying an overall time shifting for the start of sequence. The time shifting may correspond to a shift of 120 degrees for the AC output signal.

In some embodiments, the current waveform fed to the motor 370 may resemble a saw-tooth pattern above the base sine wave. The frequency of the saw-tooth pattern may correspond to the rate of the pulse. For each saw-tooth pattern in the current output, the increase may correspond to the conduction part of the cycle, while the decrease may correspond to the non-conduction part of the cycle. The system inductance (e.g., mainly the motor 370) may limit the instantaneous change of the current into the motor 370. The capacitor(s) in the VFD filter section may limit this variation by ensuring that the DC power supply can deliver the instantaneous current to the motor 370.

The VFD 400 may generate a current having a sine wave form at selected frequencies (and amplitudes) by controlling the timing of the switches; however, noise may be generated by the switching process. The output noise is mainly due the fact that the output signal (e.g., current and voltage) is periodic but not perfectly sinusoidal. As a result, harmonics may be present (e.g., up to 3000 Hz or more).

The rectifier of the VFD 400 may also be a source of noise, especially if the filter section is not optimized for the load. Harmonic distortion may occur during the rectification process. This may affect the current fed by the alternator to the VFD 400. Harmonics up to the 25th order may be affected. With a 60 Hz alternator supply, noise up to 1500 Hz may be generated. Such noise may radiate EM current, which may affect other devices in the surrounding area. For example, the noise may interfere with the reception of low amplitude EM telemetry from the MWD tool 354 in the wellbore 330. Such noises may be minimized by: (1) shielding of the cables between the generator and the VFD 400 and/or (2) passive filters associated with the rectifiers of the VFD 400.

The harmonic components of the current or voltage may be obtained via a fast-Fourier transform ("FFT") of the measurements on/between the wires. As it is a periodic signal, these components may be defined by the calculation of the Fourier series. The measurement time may be estimated by the sum of a limited number of terms of the Fourier series.

In some embodiments, the VFD 400 may be "combined" such that one rectifier feeds multiple inverters via a filter section. When the VFD 400 drives multiple motors at similar speed and torque conditions, beating and intermodulation may occur. Beating occurs when two sinusoidal signals are generated at similar frequencies at the same amplitude: The result can be:

$$\cos\omega 1 t + \cos\omega 2 t = 2\cos\left(\frac{\omega 1 + \omega 2}{2} t\right)\cos\left(\frac{\omega 1 - \omega 2}{2} t\right) \quad (1)$$

Intermodulation may occur with non-linear systems. In both cases, low frequencies are generated. The low frequency signals may couple to (e.g., interfere with) other signals that are being measured around the rig.

Current generates noise by EM radiation around the current path (e.g., the cable). Magnetic flux noise may be proportional to the current. The induced magnetic fluxes may generate an AC voltage difference in other systems, and this effect may increase with frequency. There may also be a voltage effect via capacitive coupling to other elements. The capacitive coupling may be affected by frequency so that leakage current is easier to generate at high frequency.

FIG. 4 illustrates a schematic view of the VFD 400, according to an embodiment. The VFD 400 may include a rectifier circuit 410 including one or more diodes (six are shown: 412). The VFD 400 may also include a filter 420 coupled to the rectifier circuit 410. The filter 420 may be or include a capacitor 422. The VFD 400 may also include an inverter circuit 430 including one or more transistors (six are shown: 432). The inverter circuit 430 may be coupled to the motor 370.

In one embodiment, one or more current probes (three are shown: 416) may be installed on the wires 414 feeding the AC power to the rectifier circuit 410. Also, one or more voltage probes (three are shown: 418) may be installed between the three supply wires (shown as VacI). One or more current probes (one is shown: 426) may be also installed on the DC power between the rectifier circuit 410 and the inverter circuit 430. One or more current probes (three are shown: 436) may also be installed on the wires 434 feeding the AC power from the inverter circuit 430 to the motor 370. Also, one or more voltage probes (three are shown: 438) may be installed to monitor the voltage between the output wires (such as VacO). These measurements may be sampled at a high rate to detect the noise. The measurements may be acquired via a synchronized analog-to-digital converters ("ADC") to allow digital processing between them (e.g., cross-correlation).

The pulses may activate the gates of the transistors 432 in the inverter circuit 430. More particularly, the pulses may be generated by a programmable logic circuit ("PLC") in view of ensuring the minimum noise due THD effect (e.g., high frequency noise) and minimization of intermodulation and signal beating (e.g., low frequency noise) due to the switching effect.

In at least one embodiment, a processor (e.g., part of a computer system) may minimize the THD of the output to the motor 370 based on a model of the VFD 400 and the motor 370. The processor may start by creating the sequence of pulses corresponding to one period of the output AC signal. Each pulse may be characterized by start time and stop time. The pulses of the sequence may be adapted by a periodic sine stretch function to influence the overall harmonic distribution. The stretch function may typically have a period which is 1/N of the base period of the desired AC output (with N being an integer). The stretch function may include multiple "frequencies" or harmonics of the base frequency (e.g., the inverse of the base period of the Ac output). Each pulse of the sequence may have its duration corrected by the amplitude of the stretch function for the corresponding time in the base period. This process allows the processor to produce the corrected pulse sequence.

When the considered pulse pattern is finalized, the processor applies it onto the combined model (e.g., VFD 400 and motors 370, 372) to determine the electrical response of the system. Then, the processor may calculate the term of the Fourier series to determine the new content of the harmonic distortion. The Fourier series may be developed either on the voltage output or on the current output from the VFD 400 to the motors 370, 372.

Figure 5:
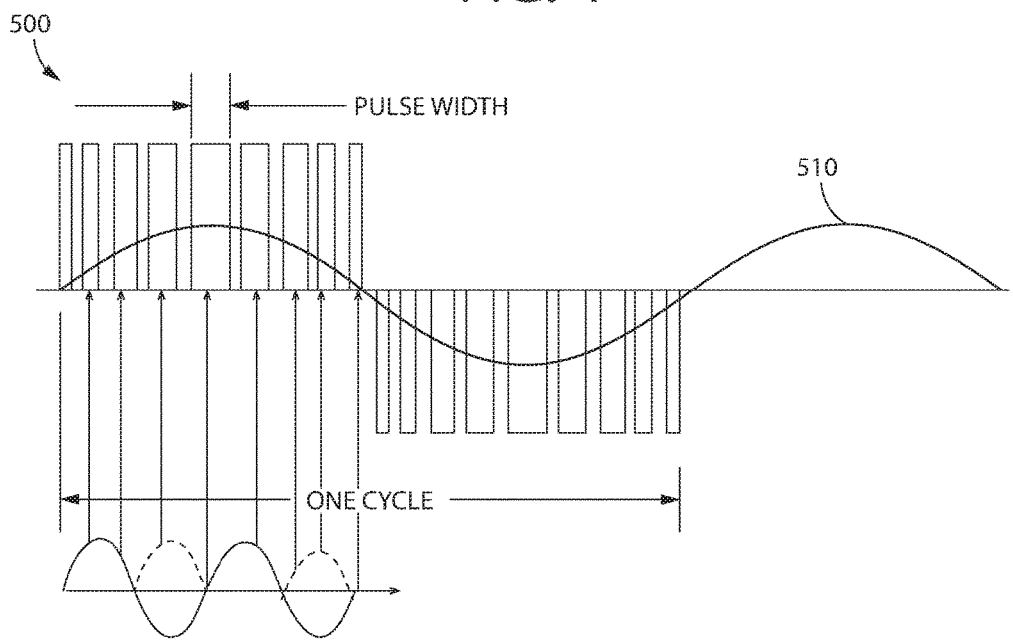
FIG. 5 illustrates a graph showing a stretching function driven by a sine wave of a period N time shorter than a base drive frequency, according to an embodiment.

FIG. 5 illustrates a graph 500 showing a stretching function 510 driven by a sine wave of a period N time shorter than a base drive frequency, according to an embodiment. The stretching function 510 may primarily affect the harmonic N. As shown in FIG. 5, the stretching function 510 stretches the $4^{th}$ harmonic. After multiple stretches of different periods to affect different harmonics, the signal may be considered modified (e.g., corrected) for harmonic aspects. This optimization of harmonic content may be directed to: (1) limiting harmonic amplitude in a given bandwidth and/or (2) limiting the overall energy in the harmonics of interest. The stretch function may be determined directly from the harmonics of the Ac output corresponding to the initially proposed pulse sequence. In some embodiments, an iterative process may be employed to optimize the stretch function.

While optimizing the pulse sequence with the usage stretch function, the processor may verify that the motors 370, 372 are driven by an AC amplitude that delivers the desired torque output. This means that the processor may perform one ore more iterations of pulse stretching to reach an optimum between THD effect and motor output (e.g., slip and/or torque). For the same overall power contained in the harmonics, stretching to increase the conducting period of some harmonics may be compensated for by stretching the "off" period for other harmonics. When the pulse sequence is considered as ready, the processor may start to use it to drive the inverter.

In another embodiment, the adjustment of the harmonics may be performed in reference to the measurement performed by the current sensors 436 and/or the voltage sensors 438 installed between the inverter circuit 430 and the motors 370, 372. The stretching may be applied as described above, while the result may be observed from the results of the Fourier series performed on the measurement itself. When the tuning is performed on the measurements, the optimization may use several output cycles.

The tuning may be based on current measurements or voltage measurements, depending on the noises to attenuate. If the noise to attenuate is due to EM radiation due to current in the cables (e.g., cables 414, 434), the stretching process may be based on the current measurement. However, if the noise to attenuate is due to capacitive coupling between part of the electrical system and the system structure, the stretching process may be based on the voltage measurement.

Figure 6:
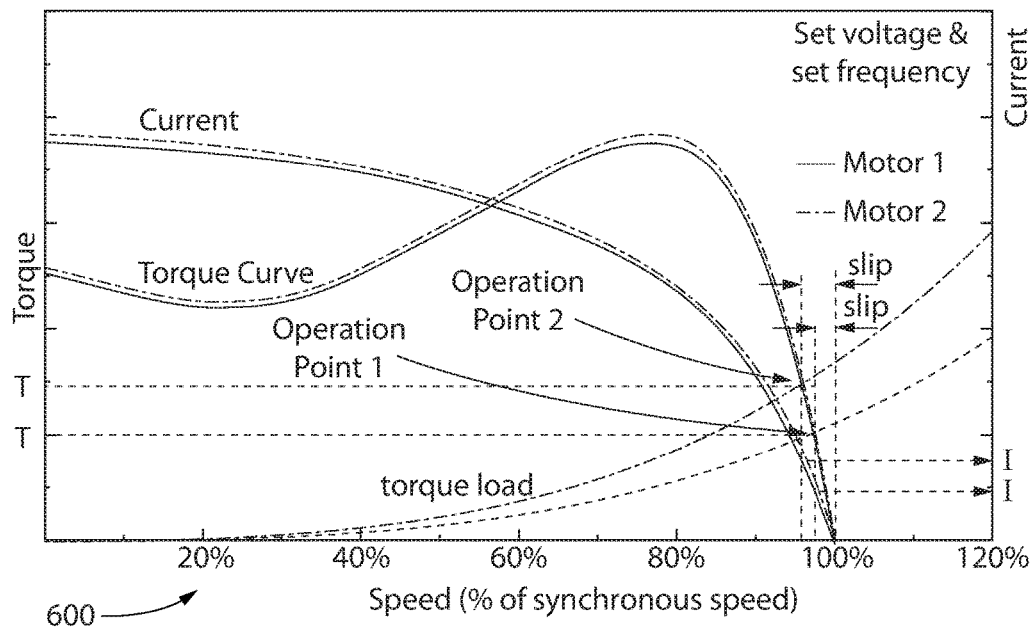
FIG. 6 illustrates a graph showing two motors operating at similar drive conditions, according to an embodiment.
Figure 7:
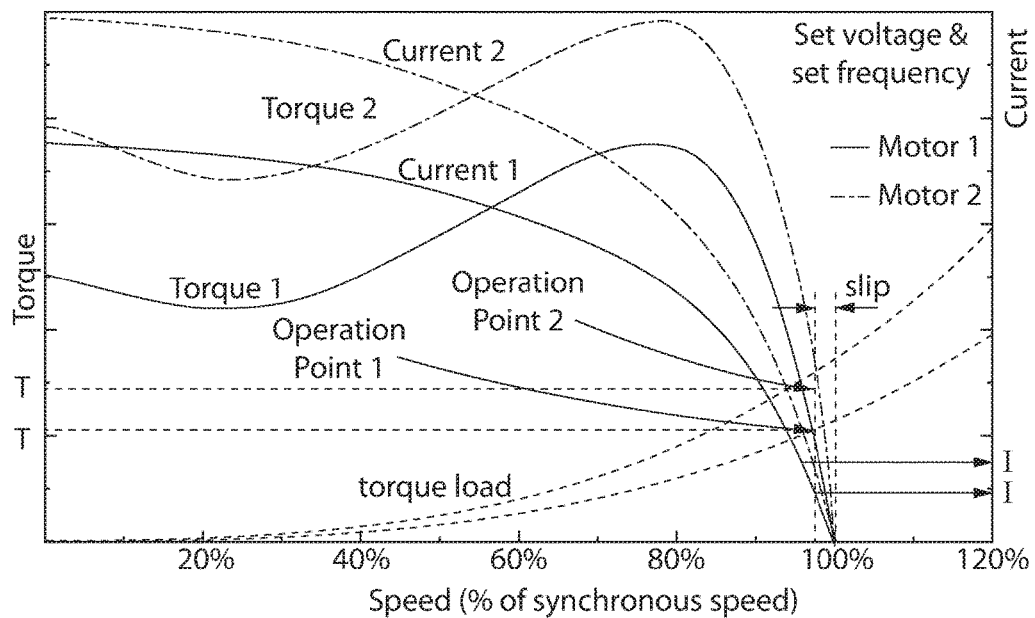
FIG. 7 illustrates a graph showing low frequency noises minimized between two motors operating at similar drive conditions, according to an embodiment.

FIG. 6 illustrates a graph 600 showing two motors operating at similar drive conditions, and FIG. 7 illustrates a graph 700 showing low frequency noises minimized between two motors operating at similar drive conditions, according to an embodiment. On a land drilling rig, one or more triplex pumps may consume power in a smooth and predictable fashion. In one embodiment, the power fed to the motors driving the triplex pumps may be optimized to lower noise generation. More particularly, when several triplex pumps rotate at similar speeds and torques, their associated inverters may generate sine waves of similar frequency and AC voltage, as shown in FIG. 6. However, the torque load of the two pumps may be different (e.g., due to different internal friction) so that the pumps may operate at different slip conditions (e.g., different speeds). In these conditions, and when the pumps are driven by the same pulse drive, the drawn currents may be different, and the pump speeds may be different. The difference in current for the same AC voltage affects some of the noise harmonics in the surrounding area. In addition, the difference in speeds may generate acoustic and pressure noise (e.g., beating in the discharged flow).

To limit low frequency noise generation by intermodulation and beating effects between the AC generated currents for the multiple similar motors, the inverters may generate the AC drive power with the same frequency. If the triplex pumps are operated at same speed, the speed adjustment may be obtained by adjusting the AC voltage amplitude. This may cause the slippage to be substantially identical, even if the torque is different. This means that the pulse width may be slightly different between the two VFDs.

In one embodiment, when the rectifier 410 feeds multiple inverters, the harmonic distortion effect on the different AC outputs may be affected by imposing a time delay between the pulse generations of the different inverters feeding the independent motors. In this example, the pulses of current sent to the different motors are not synchronous. Thus, the current pulses pulled on the supply side of the two inverters are not synchronous. With such a condition, the instantaneous current provided by the rectifier 410 and the filter 320 may be of smaller amplitude. As a result, the THD at the rectifier 410 may be reduced.

Also the harmonic distortion pattern may be affected with reduction of amplitude in a predetermined bandwidth. In practical terms, the noise pattern may be optimized either to provide lower noise in a predetermined bandwidth or to minimize the total energy due to harmonic distortion. The time delay between pulses for inverters 430 driving different motors may be either based on a predefined relation based on motor load or based on the FFT performed on the current measurements and or voltage measurements on both sides of the rectifier 410. The processor may generate the optimum pulse sequences to drive one motor. Then, the processor may generate a pulse sequences for the other motor with a slight shift in phase difference. Then, two motors may be driven with their corresponding switching. Measurements may be performed on the current in and out of the VFD. The total harmonic distortion ("THD") may be determined for the IN and OUT currents. The THD's may be summed. Then, the drive pulse series allowing the lower sum of THD's may be the solution and used to continue the motor operation.

Figures 1, 8:
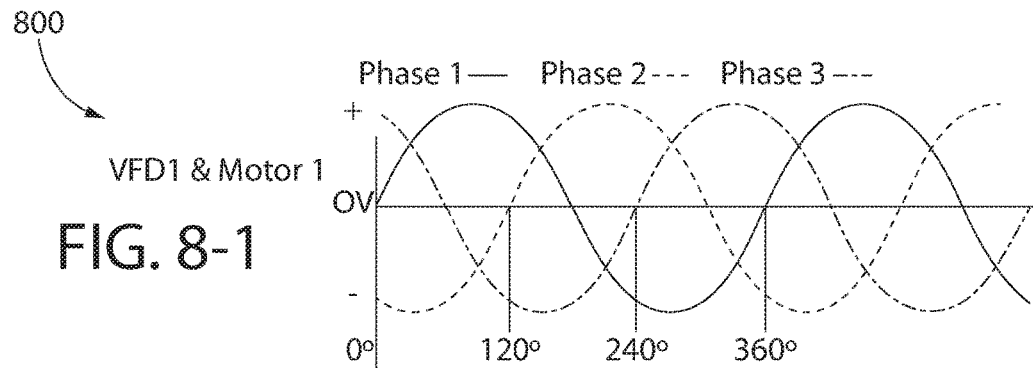
Figures 2, 8:
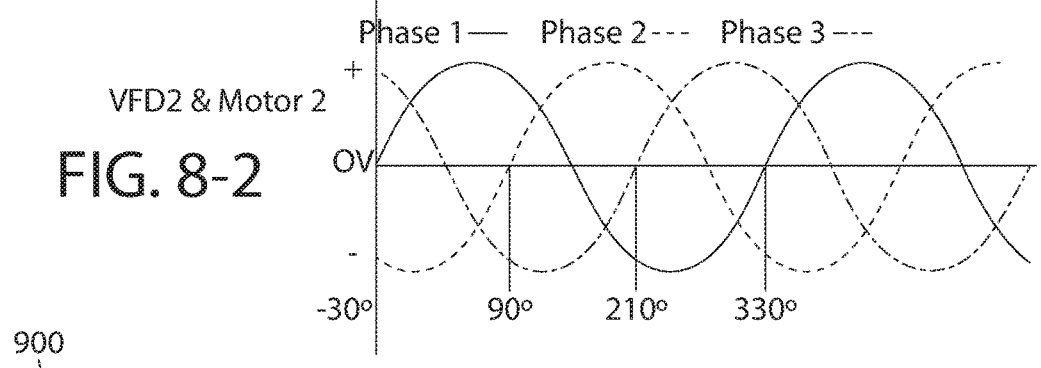

FIGS. 8-1 and 8-2 illustrate graphs 800, 810 showing the phase of the AC signal applied to different motors being shifted, according to an embodiment. The phase may be shifted to limit the instantaneous current from the DC supply. This may limit the generation of noise by limiting the current surge at the DC supply of the VFD 400. For example, with two motors in action, the optimum shifting for the AC signals may be 30 degrees. This may be the maximum separation between the 3 phase currents corresponding to the two motors. The optimum phase shift may be determined by the processor by modelling the process of the motor operations or by measurements of THD versus phase-shift the AC power to the motor. The selected phase shift may correspond to the minimum phase shift between the 2 VFD/motor assemblies.

Figure 9:
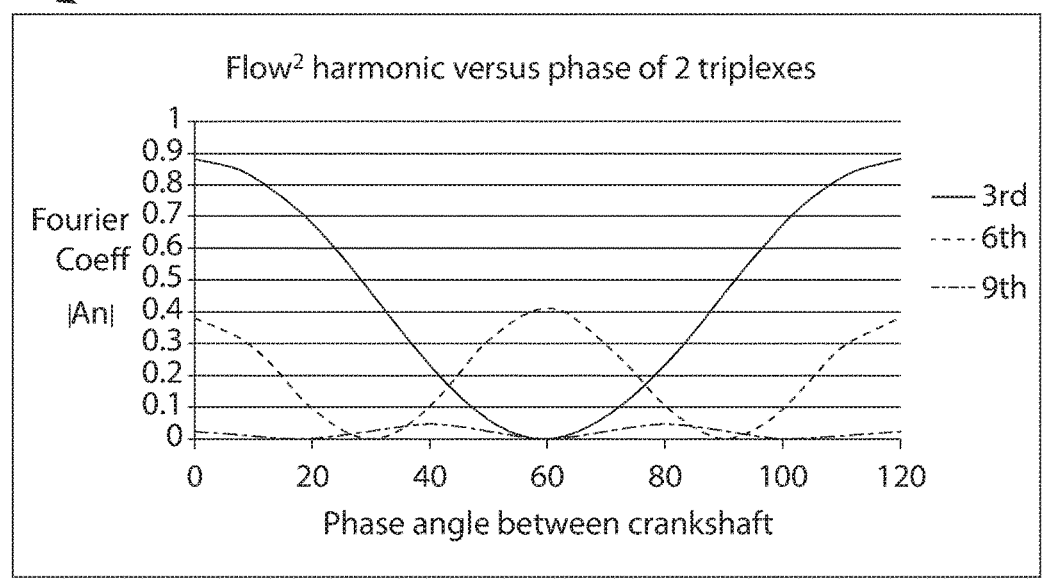
FIG. 9 illustrates a graph showing the flow harmonics versus phase angle of two triplexes, according to an embodiment.

FIG. 9 illustrates a graph 900 showing the flow harmonics versus phase angle of two triplexes, according to an embodiment. In some pumping operations, the total flow rate may be more relevant than the setting of each pump. As explained above, the pumps may be run at the same speed with the VFD 400 set at the same frequency and tuning the pump RPM via the AC voltage. As shown in FIG. 9, the angle between the pump crankshafts may affect the surge of flow in the line. With two triplex pumps, a 60 degree phase-shift may be optimum to limit the $3^{rd}$ harmonic. In addition, a 30 degree or 90 degree phase-shift may minimize the $6^{th}$ harmonics. Moreover, a 20 degree, 60 degree, or 100 degree phase-shift may minimize the $9^{th}$ harmonics.

Such controlled rotation may be imposed by controlling the output of the VFD 400 by slightly increasing or decreasing the AC amplitude fed to the different motors. The angular correction may be achieved after several shaft rotations. Then, the drive may be retuned "slowly" to the optimum level to ensure that the triplexes are turning at the same speed with the steady crankshaft angular offset. The progressive adjustment may reduce the noise generation.

When the pumps operate at similar speeds and/or torques, the signals from the inverters may be similar. However, the pulse-width may have a slightly different duration at each moment of the sine wave, as the load between the pumps may be slightly different. The may be due to, for example, more friction in one pump seal than another. In such case, intermodulation may occur between these pulses, or their content in the frequency domain. This intermodulation may generate some noise at frequencies lower than the modulation frequency. Such lower frequencies may affect other devices operating at or below the normal AC frequency at the rig (e.g., 60 Hz). To avoid such issues, the pulses may be generated for each inverter 430 based at least partially on different modulation frequencies. More particularly, the processor may generate multiple patterns of pulse-width for each VFD 400, so that the AC generated frequency and amplitude are within a predetermined range while different modulations are used, avoiding intermodulation.

In one embodiment, reducing and adapting the noise generated by the VFDs 400 may reduce interference with low power signal measurements. One such signal measurement may be the signal corresponding to the telemetry reception of the downhole e-mag telemetry from the MWD tool 354. The reduction in noise may occur in a limited frequency bandwidth. This bandwidth may be lower frequency than the drive frequency of the motors 370. In such case, the beating effect and intermodulation may be the noise element to minimize. In other embodiments, the bandwidth may be higher frequency than the drive frequency of the motors 370. In such case, THD of the power fed to the motor 370 and the THD effect on the rectifier input line may have to be minimized.

To improve the detection of the EM telemetry signal (e.g., the signal sent from the BHA 340), the signal may be monitored by the signal detectors 360, 362 via the associated ADC while the motors 370, 372 and VFD 400 are operating. The desired normal input into the signal detectors 360, 362 may be removed. For example, with MWD EM telemetry, the MWD tool 354 may be turned off for a certain known period. Then, the acquired signal by the ADC on the signal detectors 360, 362 may be performed while the drive of the motors 370 is adapted by (1) changing the pulse sequences as discussed above, (2) changing the phase between motor drive signal, (3) change the phase between the pulse series, or by a combination of such methods.

For each drive setting, acquisition may be performed by the ADC on the signal detectors 360, 362 (e.g., with the normal signal generation being "off"). The root-mean-square ("RMS") value of this measurement may be determined in the predetermined bandwidth for each drive condition. Then, the selected operating conditions corresponding to the minimum RMS energy may be selected to continue the motor operation while the measurement is performed in normal conditions (e.g., with MWD EM telemetry active).

In one example, a drawworks may use a large current to pull a tubular out of a slip. The current may be sustained during the upwards movement of the hook 310 above the rig floor. While moving upwards, the hook 310 may be under a constant pull-force and speed. This means that the current and voltage applied onto the motor 370 may be steady during this movement.

The sudden surge of current while going out of slips may be a source of noise in the rig electrical system. During this transition, the drawworks passes from no-rotation to slow rotation. To ensure the slow rotation, the VFD 400 may operate at its lowest possible frequency of AC output, while typically maintaining the output voltage proportional to the output frequency so that the motor 370 operates at constant torque. The VFD 400 may generate an output that does not allow the motor 370 to generate a torque capable to lift the string. This means that the motor 370 is stalled, while heat is generated in the motor 370 due to current which is mainly limited with stator resistance. To help reduce the stator current, a higher switching-based frequency may be used so that the instantaneous current through the switch and the motor 370 are limited by the inductance of the motor 370. Such high frequency switching may not be used for long periods as heat is generated through the switch (e.g., the IGBT) during each transition "on/off" and "off/on." As soon as the motor 370 moves at sufficient speed, the output frequency of the VFD 400 may be increased, and the motor 370 operates at its normal operating point. This means that the output current is normally limited. The VFD 400 may then be operating at its normal switching frequency.

Figure 10:
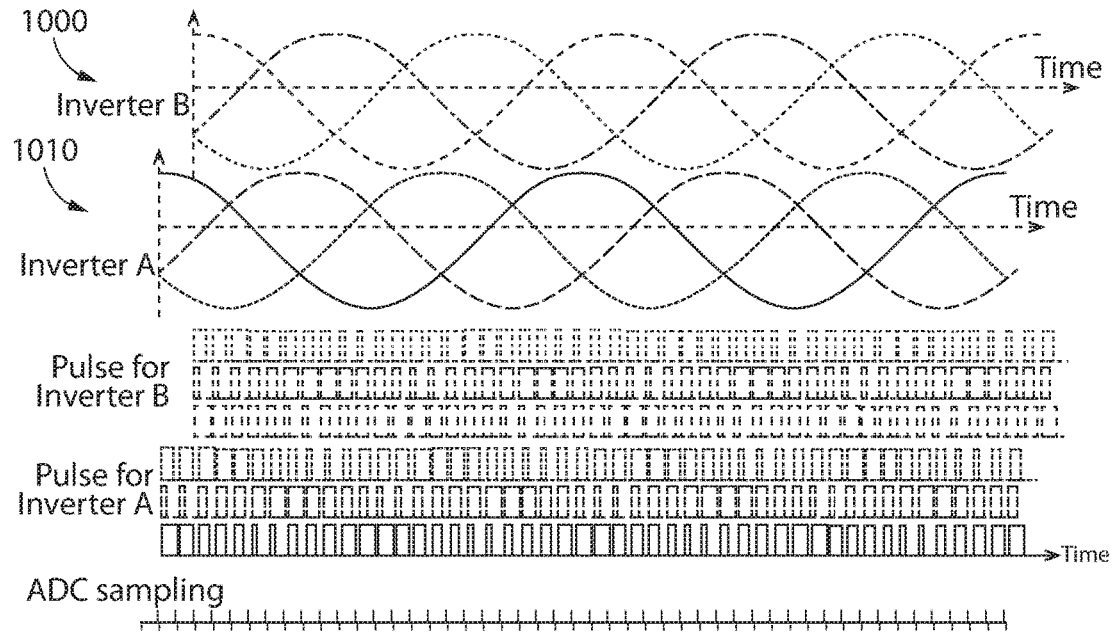
FIG. 10 illustrates two graphs showing sine wave modulation with a synchronous leading edge, according to an embodiment.

In some embodiments, the drawworks may be driven by multiple motors 370 that are driven by independent inverters 430. The motors 370 may rotate at the same speed because they are connected to the drawworks by the same reducer (gear or chain). In such case, the motors 370 may be driven by the same AC frequency and amplitude. However, the AC signal may be shifted, as shown in FIG. 10). With a system equipped with two motors, the shift may be 30 degrees to limit the load on the DC bus and the rectifier 410. Also, during the upwards movement of the hook 310, the THD may be optimized as previously discussed. In the case of noise optimization on a specific measurement system, the noise minimization may be obtained by using different switching frequencies for the independent inverters 430. The selection of frequency combinations may be obtained by overall system modelling by the system PLC (or even another processor), or by present learning performed by the PLC during previous lifting sequences. The frequency combinations may depend on the lifted load (i.e., the "hookload"). The hookload information may be obtained from a hookload sensor or from the current measurement on the motor 370.

When considering the rotation of the drill string 334, the torque may be continuously changing due to a stick & slip effect generated by the drilling process. The motor(s) 370 may be driven at constant frequency. Due to a change of torque, the "motor slip" may vary. As the motor slip changes, the current may also change. Due to this change of load, the VFD 400 may try to adjust the inverter switching to ensure that the AC output voltage remains constant. The effect of "drilling stick & slip" may occur at low frequencies (e.g., lower than 1 hertz). This means that the inverter 430 may have many AC cycles to do the adjustments (e.g., 100 cycles). In such case, the output signal may not be truly periodic due to these adjustments. This means that the harmonics are also influenced continuously, and the electrically-generated noise is also continuously changing.

The usage of two (or more) motors 370 with independent inverters 430 to drive the string rotation may offer similar benefit with the drawworks. The PLC also may be programmed to perform some control of the stick & slip. When the torque increases (e.g., based on a current increase measurement), the PLC may let the output frequency decrease until it is lower than the RPM of the drill string 334. A pre-defined relationship of frequency versus torque increase may be followed as part of the logic for stick-slip management. However, to limit the generation of noise by THD, the PLC may impose a switching pattern, which is optimized by the objectives of lowering noise. In this case, the noise management may be adapted to the speed transient. The torque may be perturbed by the inertia effect t (e.g., rotating inertia by rotating acceleration).

FIG. 10 illustrates two graphs 1000, 1010 showing sine wave modulation with a synchronous leading edge, according to an embodiment. The leading edge of the "turn-on" pulses may be synchronized by an external reference clock for the output signal of the inverter for the three phases used to drive one motor 370. The pulse-width may be different between the three phases so that the 120 degree phase difference is obtained between the three phases of one inverter 430.

When considering multiple inverters 430 driving independent motors 370, the same synchronization between leading edge of the pulse may be maintained. However, the AC signals between the different motors 370 may be phase-shifted by shifting the pulse pattern between the inverters 430 by the phase for the AC drive signal. FIG. 10 shows this pattern for two inverters (A and B) which drive two motors.

When an ADC is being used for sampling measurements around the rig, the ADC sampling may be performed just before the leading edge of the inverter pulse. This may cause the measurement sampling to be obtained when the current in the motor phases are at a minimum before the next switching. With such coordination, the measurements may experience minimum noise.

Figure 11:
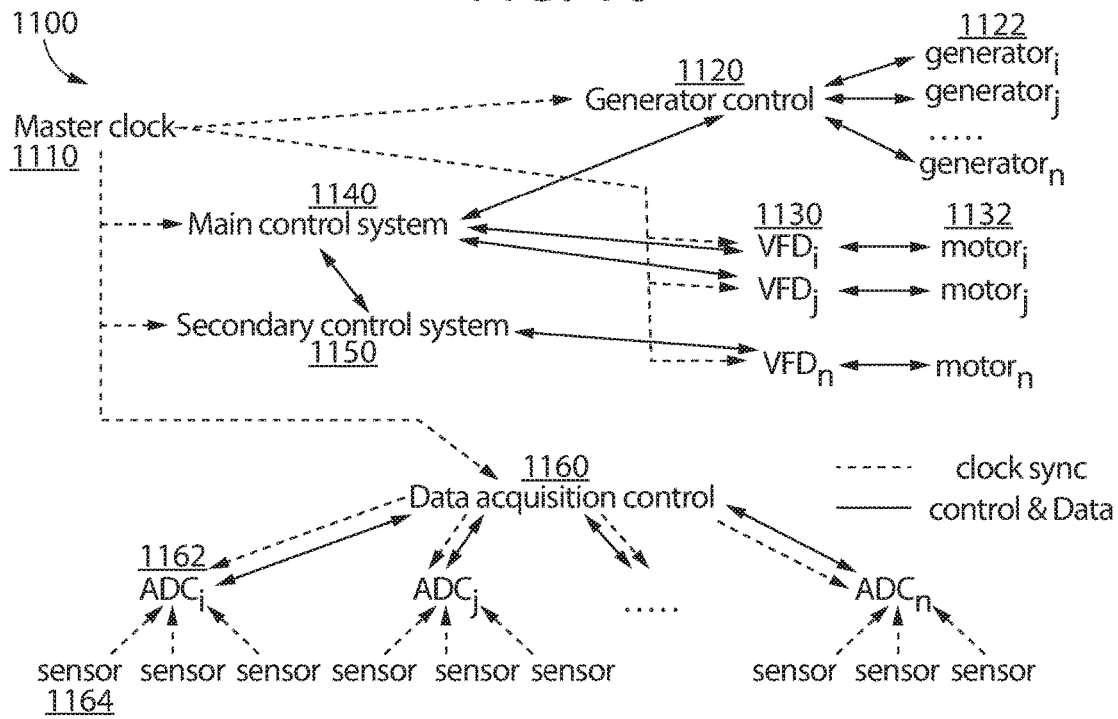
FIG. 11 illustrates a schematic view of an electronics system at the well site system, according to an embodiment.

FIG. 11 illustrates a schematic view of an electronics system 1100 at the well site system 300, according to an embodiment. The electronics system 1100 may include a master clock 1110. The master clock 1110 may send clock sync signals to a generator controller 1120, one or more VFDs 1130, a main control system 1140, a secondary control system 1150, and a data acquisition controller 1160. The generator controller 1120 may send and receive control and data signals to/from one or more generators 1122. The VFDs 1130 may send and receive control and data signals to/from one or more motors 1132. The data acquisition controller 1160 may send clock sync signals to one or more ADCs 1162. The data acquisition controller 1160 may also send and receive control and data signals to/from the ADCs 1162. The ADCs 1162 may also receive clock sync signals from one or more sensors 1164.

Figure 12:
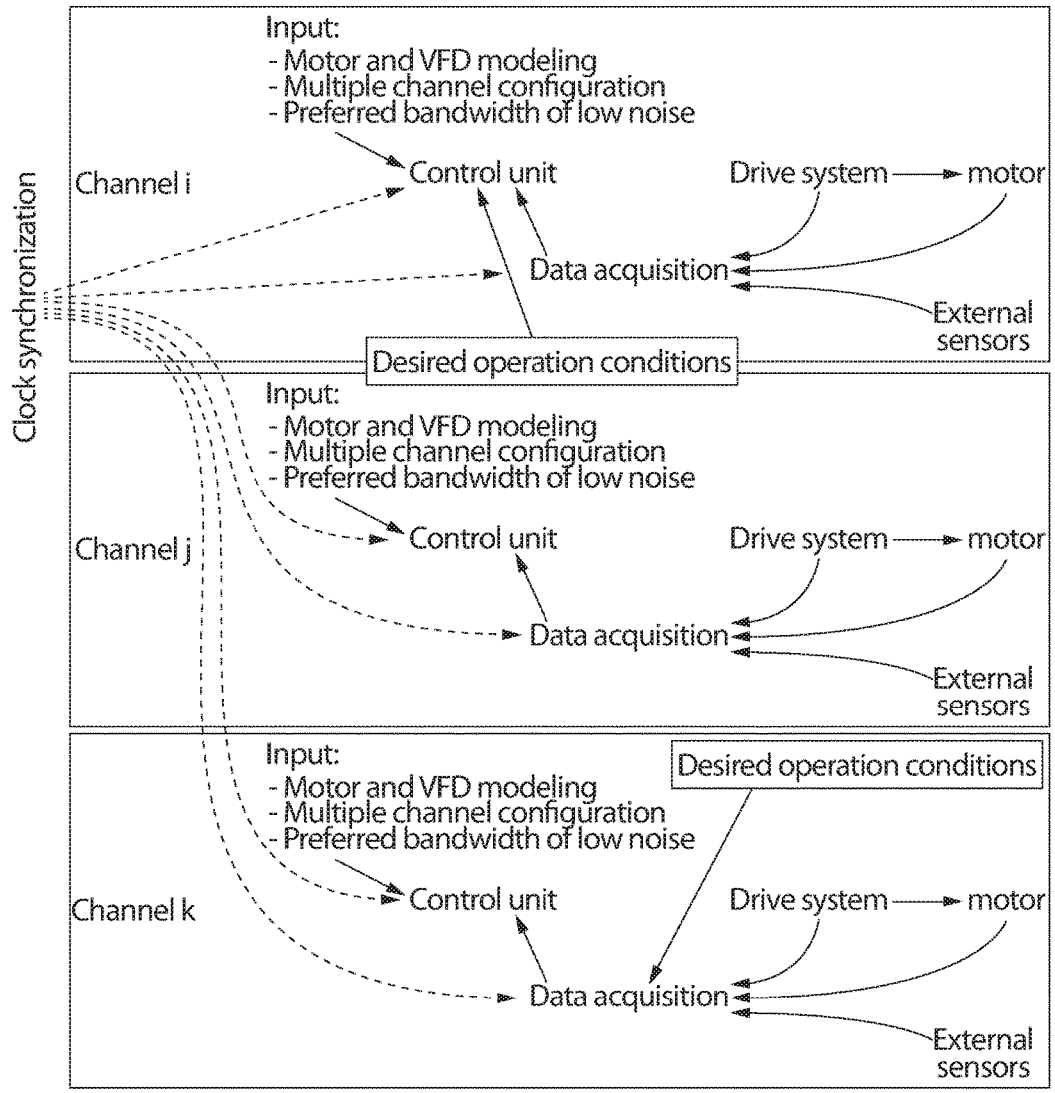
FIG. 12 illustrates a flow diagram for controlling a VFD, according to an embodiment.

FIG. 12 illustrates a flow diagram 1200 for controlling one or multiple VFDs which drive(s) motor(s), according to an embodiment. Each motor with its VFD drive is considered to be one channel. The VFD may include the analog and power electronics and the VFD control unit (a local PLC). Within each channel, an input may be provided to a control unit. Some input may be generated by a control system (1140 or 1150 of FIG. 11). Other input may be generated by a control panel. The input may include motor and VFD models, a multiple channel configuration, and a predetermined bandwidth of low noise. Data from a drive system, one or more motors, and external sensors may also be provided to a data acquisition module, which may transmit this data to the control unit. Clock synchronization may also be provided to the control unit and the data acquisition module. The desired operation conditions for the motor may also be an input for the channel. This may include motor RPM, torque, acceleration, etc.

Figure 13:
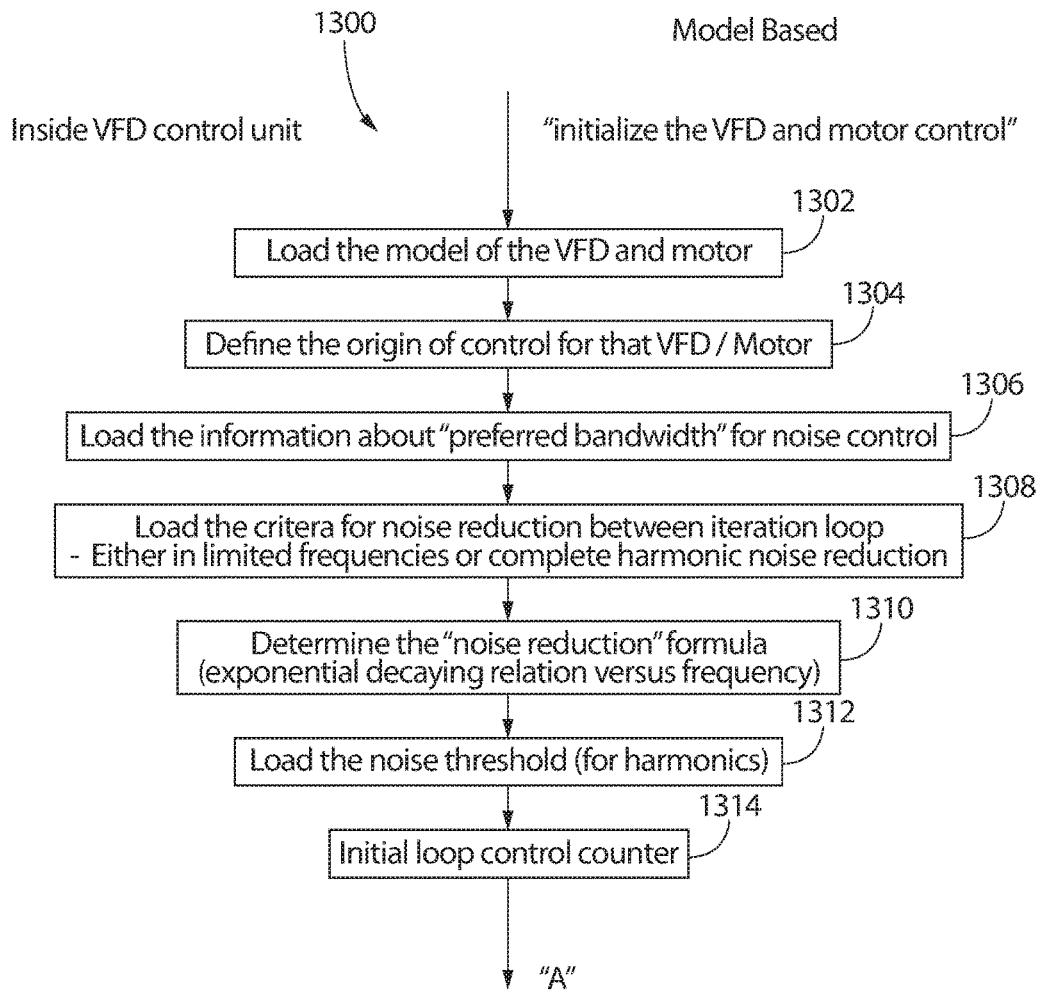
FIG. 13 illustrates a flowchart of a model-based method for reducing harmonics in a VFD output, according to an embodiment.
Figure 13:
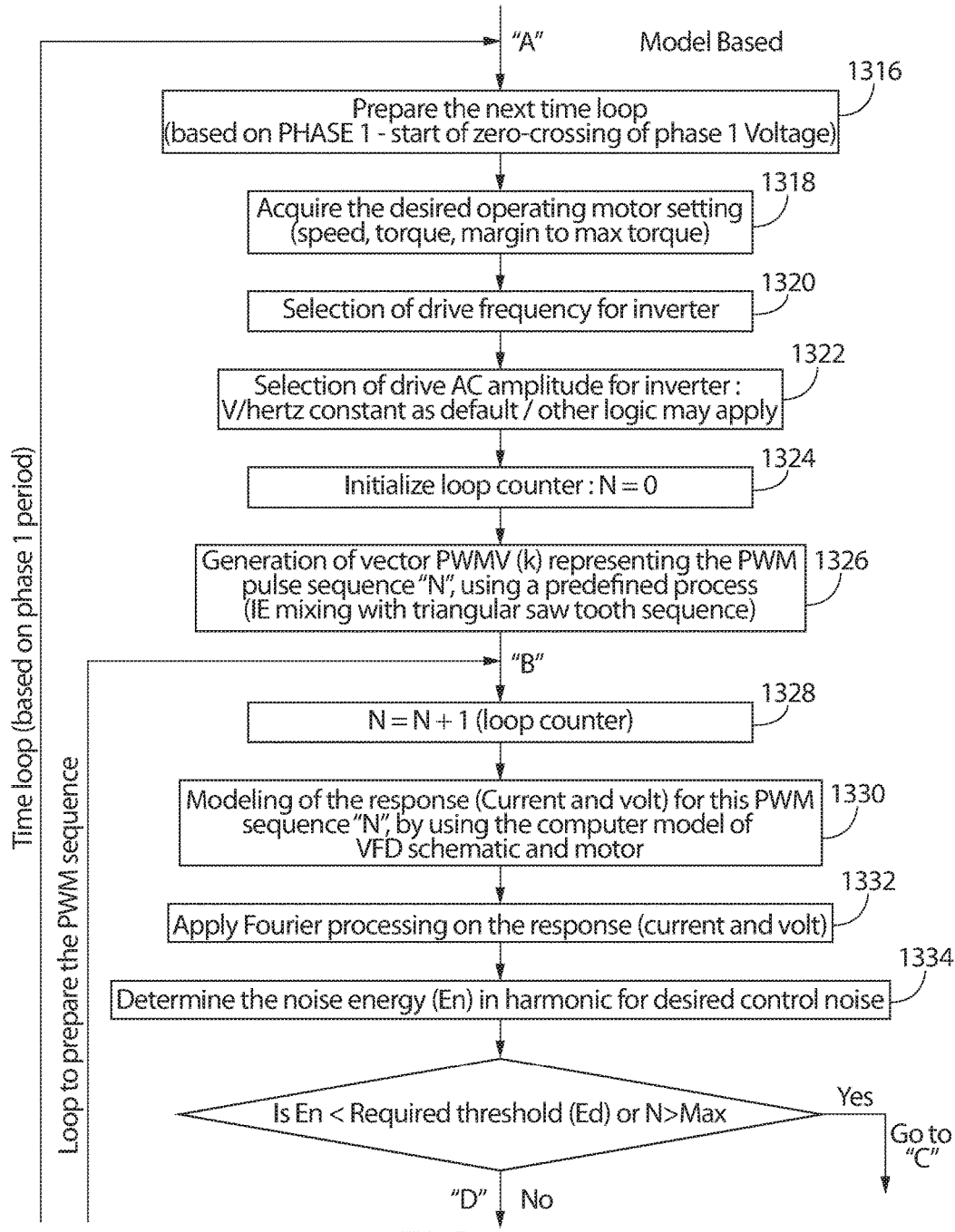
Figure 13:
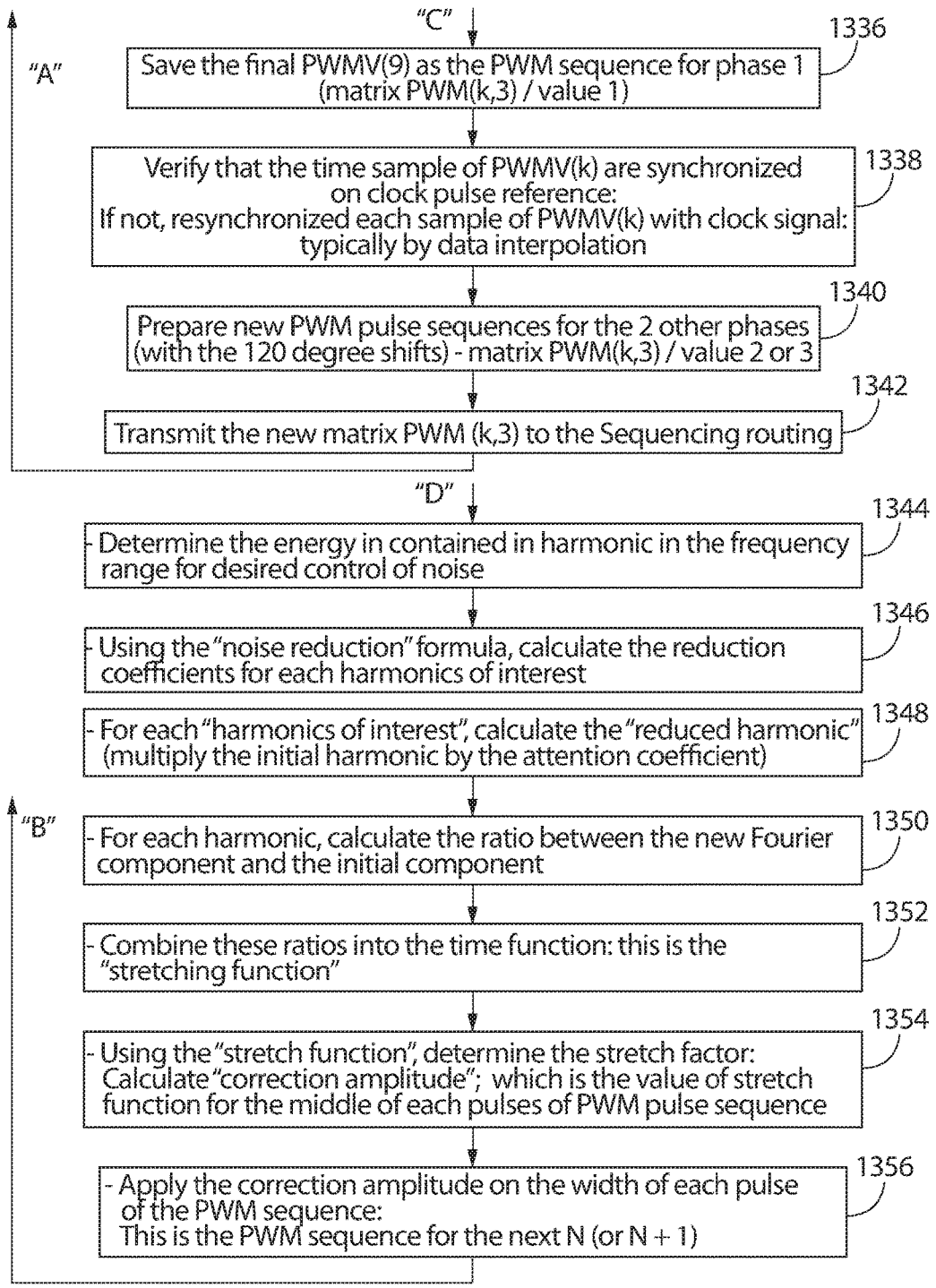

FIG. 13 illustrates a flowchart of a model-based method 1300 for reducing harmonics in a VFD/motor operation, according to an embodiment. The method 1300 may include loading a model of a VFD and a motor into the memory of the drive PLC, as at 1302. The method 1300 may also include defining an origin of control for the VFD and/or the motor, as at 1304. The method 1300 may also include loading information about a predetermined bandwidth for noise control (e.g., reduction), as at 1306. The method 1300 may also include loading criteria for noise reduction between an iteration loop, as at 1308. The criteria may be in limited frequencies or a complete harmonic noise reduction. In some embodiments, the method 1300 may also include determining a noise reduction formula, as at 1310. The formula may be an exponential decaying relation versus frequency. The method 1300 may also include loading a noise threshold for some harmonics, as at 1312. The method 1300 may also include setting an initial loop control counter, as at 1314.

The method 1300 may also include preparing another time loop based on a first phase (e.g., the start of the zero-crossing of the voltage of the first phase), as at 1316.

The method 1300 may also include acquiring a desired operating motor setting, as at 1318. The motor setting may be or include the speed, torque, margin to max torque, etc. The motor setting may be acquired from a sensor or from a main control system. The method 1300 may also include selecting a drive frequency of an inverter, as at 1320. The method 1300 may also include selecting a drive voltage (e.g., AC voltage) for the inverter, as at 1322. The method 1300 may also include initializing a loop counter (e.g., N=0), as at 1324. The method 1200 may also include determining a PWM voltage vector that represents the PWM pulse sequence (e.g., N) using a predefined process, as at 1326. For example, the process may include mixing the vector with a triangular saw tooth sequence.

The method 1300 may also include incrementing the loop counter (e.g., N=1), as at 1328. Once the loop counter has been incremented, the response (e.g., current and voltage) may be modelled for this PWM sequence, as at 1330. For example, the response may be modelled using the model of the VFD and motor. The method 1300 may also include applying a Fourier transform on the response (e.g., current and voltage), as at 1332. The method 1300 may also include determining the noise energy in the harmonics, as at 1334. If the noise energy in the harmonics is less than a predetermined threshold, then the final PWM voltage may be saved as the PWM sequence for the first phase, as at 1336. The method 1300 may also include verifying that the time sample of the PWM voltage is synchronized with the reference clock, as at 1338. If not, each sample of the PWM voltage may be resynchronized with the clock signal (e.g., by data interpolation). The method 1300 may also include preparing PWM pulse sequences for the other two phases (e.g., with 120 degree shifts of the desired output to the motor), as at 1340. The method 1300 may also include transmitting the PWM pulse sequences for the other two phases to the sequence routing (e.g., at 1316), as at 1342.

Returning to 1334, if the noise energy in the harmonics is greater than the predetermined threshold, then the method 1300 may include determining the energy in the harmonics in the predetermined frequency range, as at 1344. Using the noise reduction formula, the reduction coefficients for each harmonic of interest may be calculated, as at 1346. For each harmonic of interest, the reduced harmonic may be calculated, as at 1348. This may include multiplying the initial harmonic by the attenuation coefficient.

The method 1300 may also include calculating a ratio between a new Fourier component and an initial Fourier component for each harmonic, as at 1350. The ratios may be converted into a time function, as at 1352. This may be the same as the stretching function mentioned above. The method 1300 may also include using the stretching function to determine the stretch vector, as at 1354. This may be done by calculating the correction amplitude, which is the value of the stretch function for the middle of each pulse of the PWM pulse sequence. The method 1300 may also include applying the correction amplitude on the width of each pulse in the PWM sequence, as at 1356. This may be the PWM sequence for the next N (e.g., N+1). The method 1300 may then loop back to 1328.

Figure 14:
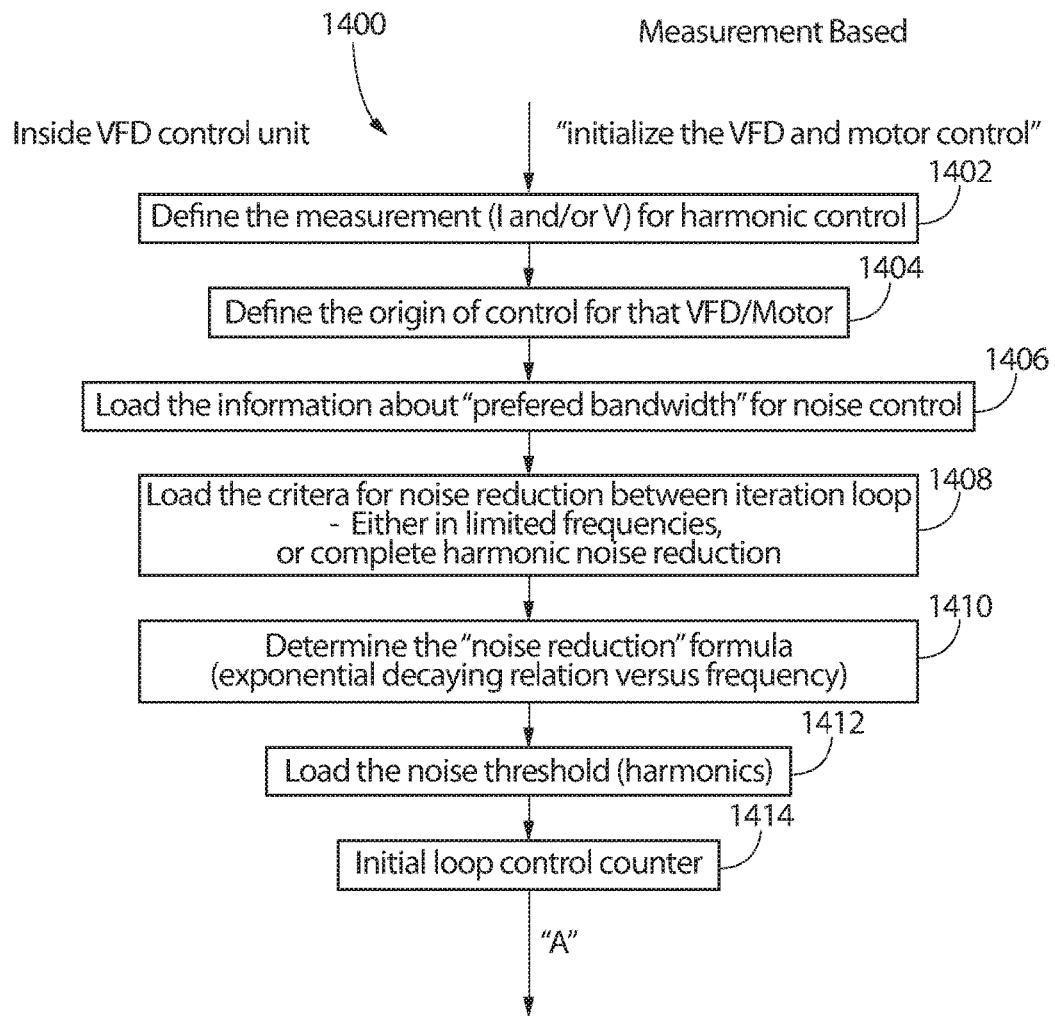
FIG. 14 illustrates a flowchart of a measurement-based method for reducing harmonics in a VFD output, according to an embodiment.
Figure 14:
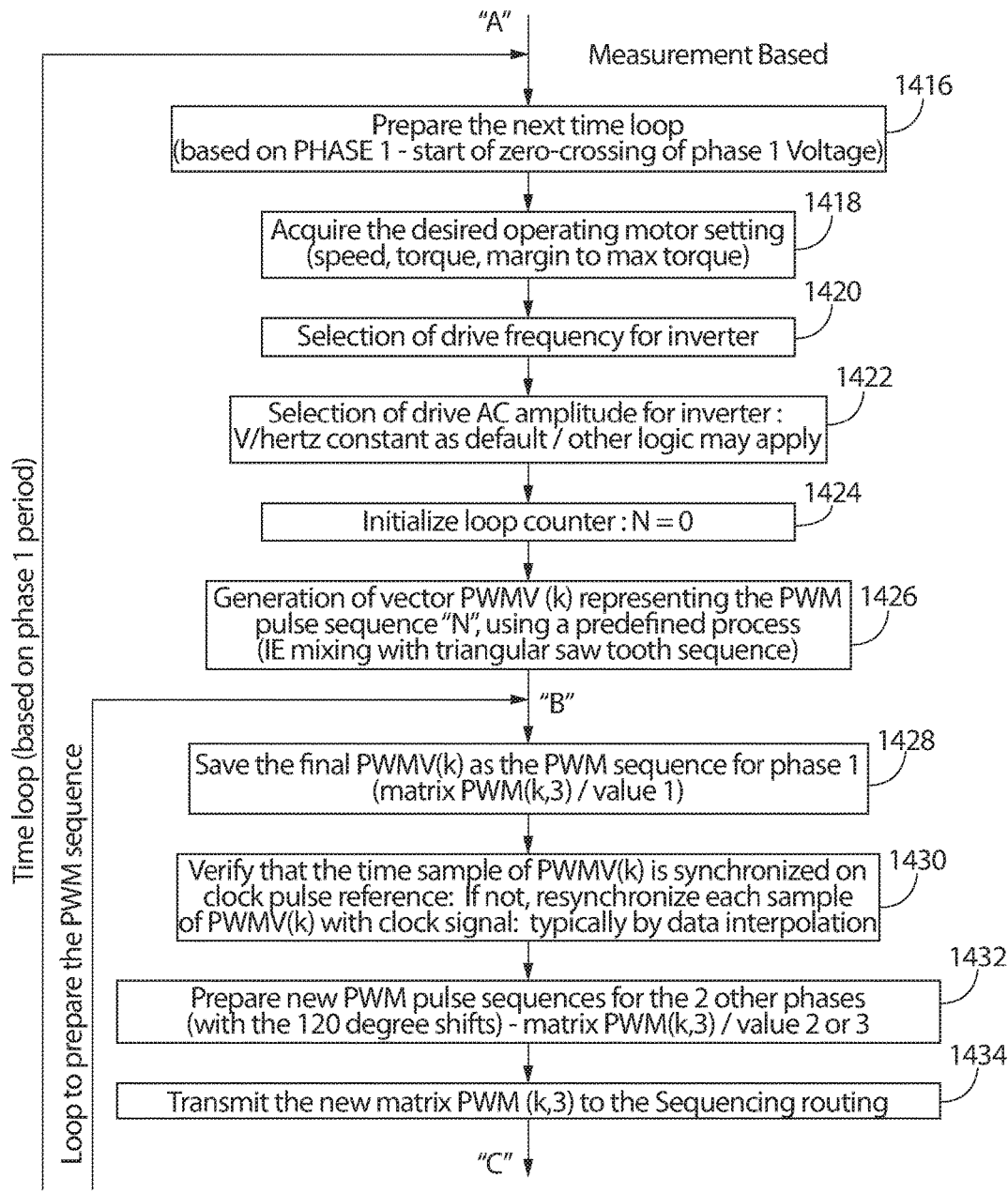
Figure 14:
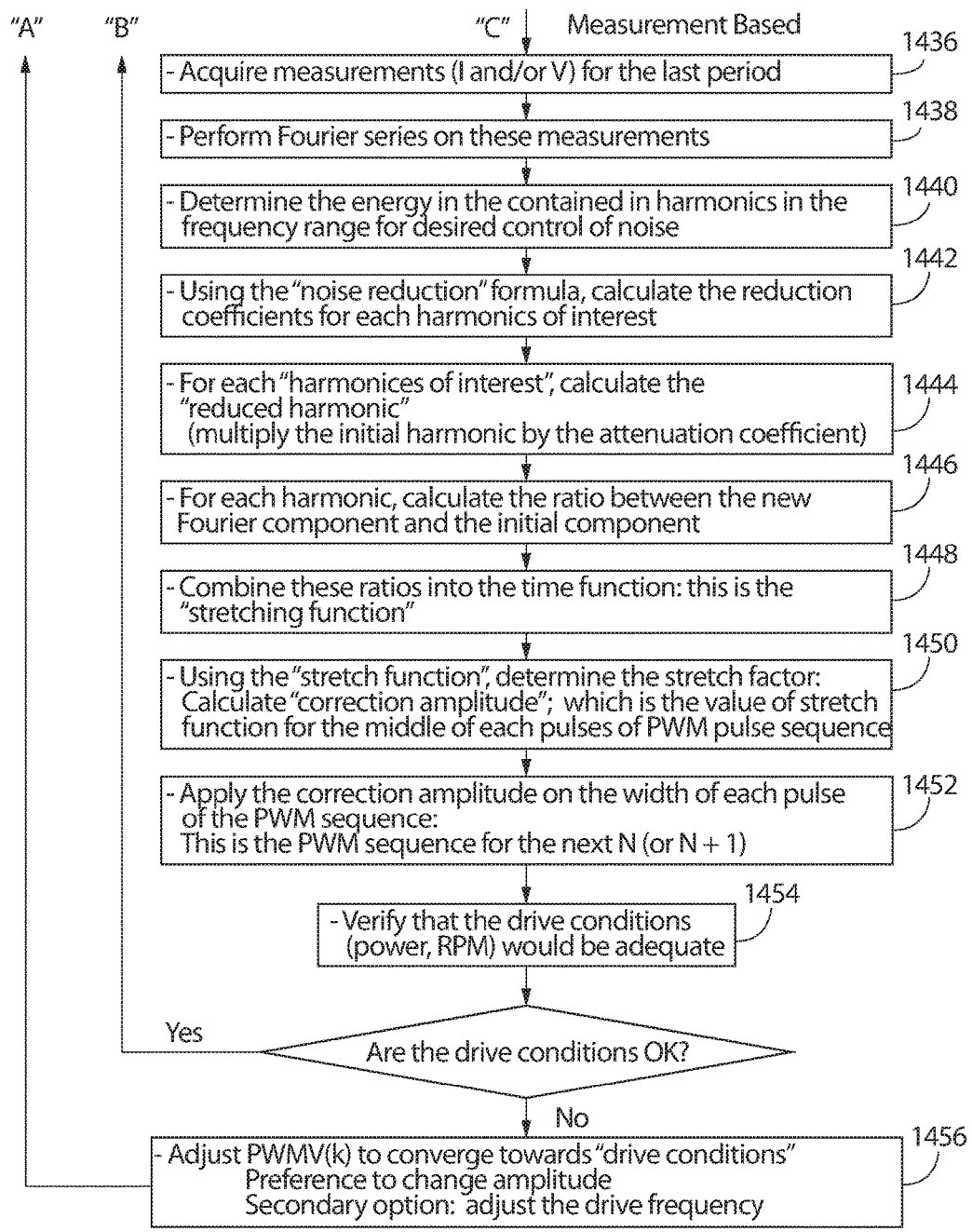

FIG. 14 illustrates a flowchart of a measurement-based method 1400 for reducing harmonics in a VFD output, according to an embodiment. The method 1400 may include defining a measurement (e.g., current and/or voltage) for harmonic control, as at 1402. The method 1400 may also include defining an origin of control for the VFD and/or the motor, as at 1404. The method 1400 may also include loading information about a predetermined bandwidth for noise control (e.g., reduction), as at 1406. The method 1400 may also include loading criteria for noise reduction between an iteration loop, as at 1408. The criteria may be in limited frequencies or a complete harmonic noise reduction. In some embodiments, the method 1400 may also include determining a noise reduction formula, as at 1410. The formula may be an exponential decaying relation versus frequency. The method 1400 may also include loading a noise threshold for harmonics, as at 1412. The method 1400 may also include setting an initial loop control counter, as at 1414.

The method 1400 may also include preparing another time loop based on a first phase (e.g., the start of the zero-crossing of the voltage of the first phase), as at 1416. The method 1400 may also include acquiring a desired operating motor setting, as at 1418. The motor setting may be or include the speed, torque, margin to max torque, etc. The motor setting may be acquired from a sensor or from a main control system. The method 1400 may also include selecting a drive frequency of an inverter, as at 1420. The method 1400 may also include selecting a drive voltage (e.g., AC voltage) for the inverter, as at 1422. The method 1400 may also include initializing a loop counter (e.g., N=0), as at 1424. The method 1400 may also include determining a PWM voltage vector that represents the PWM pulse sequence (e.g., N) using a predefined process, as at 1426. For example, the process may include mixing the vector with a triangular saw tooth sequence.

The final PWM voltage may be saved as the PWM sequence for the first phase, as at 1428. The method 1400 may also include verifying that the time sample of the PWM voltage is synchronized with the reference clock, as at 1430. If not, each sample of the PWM voltage may be resynchronized with the clock signal (e.g., by data interpolation). The method 1400 may also include preparing PWM pulse sequences for the other two phases (e.g., with 120 degree shifts), as at 1432. The method 1400 may also include transmitting the PWM pulse sequences for the other two phases to the sequence routing, as at 1434.

The method 1400 may also include acquiring measurements (e.g., current and/or voltage) for the previous period, as at 1436. A Fourier transform may be performed on the acquired measurements, as at 1438. The method 1400 may also include determining the energy in the harmonics in the predetermined frequency range, as at 1440. Using the noise reduction formula, the reduction coefficients for each harmonic of interest may be calculated, as at 1442. For each harmonic of interest, the reduced harmonic may be calculated, as at 1444. This may include multiplying the initial harmonic by the attenuation coefficient.

The method 1400 may also include calculating a ratio between a new Fourier component and an initial Fourier component for each harmonic, as at 1446. The ratios may be combined into a time function, as at 1448. This may be the same as the stretching function mentioned above. The method 1400 may also include using the stretching function to determine a stretch vector, as at 1450. This may be done by calculating the correction amplitude, which is the value of the stretch function for the middle of each pulse of the PWM pulse sequence. The method 1400 may also include applying the correction amplitude on the width of each pulse in the PWM sequence, as at 1452. This may be the PWM sequence for the next N (e.g., N+1).

The method 1400 may also include verifying that the drive conditions (e.g., power, RPM, etc.) are adequate, as at 1454. If the drive conditions are adequate, the method 1400 may loop back around to saving the final PWM voltage, as at 1428. If the drive conditions are not adequate, the method 1400 may include adjusting a PWM voltage to converge toward a predetermined drive condition, as at 1456. In another embodiment, the drive frequency may be varied.

Figure 15:
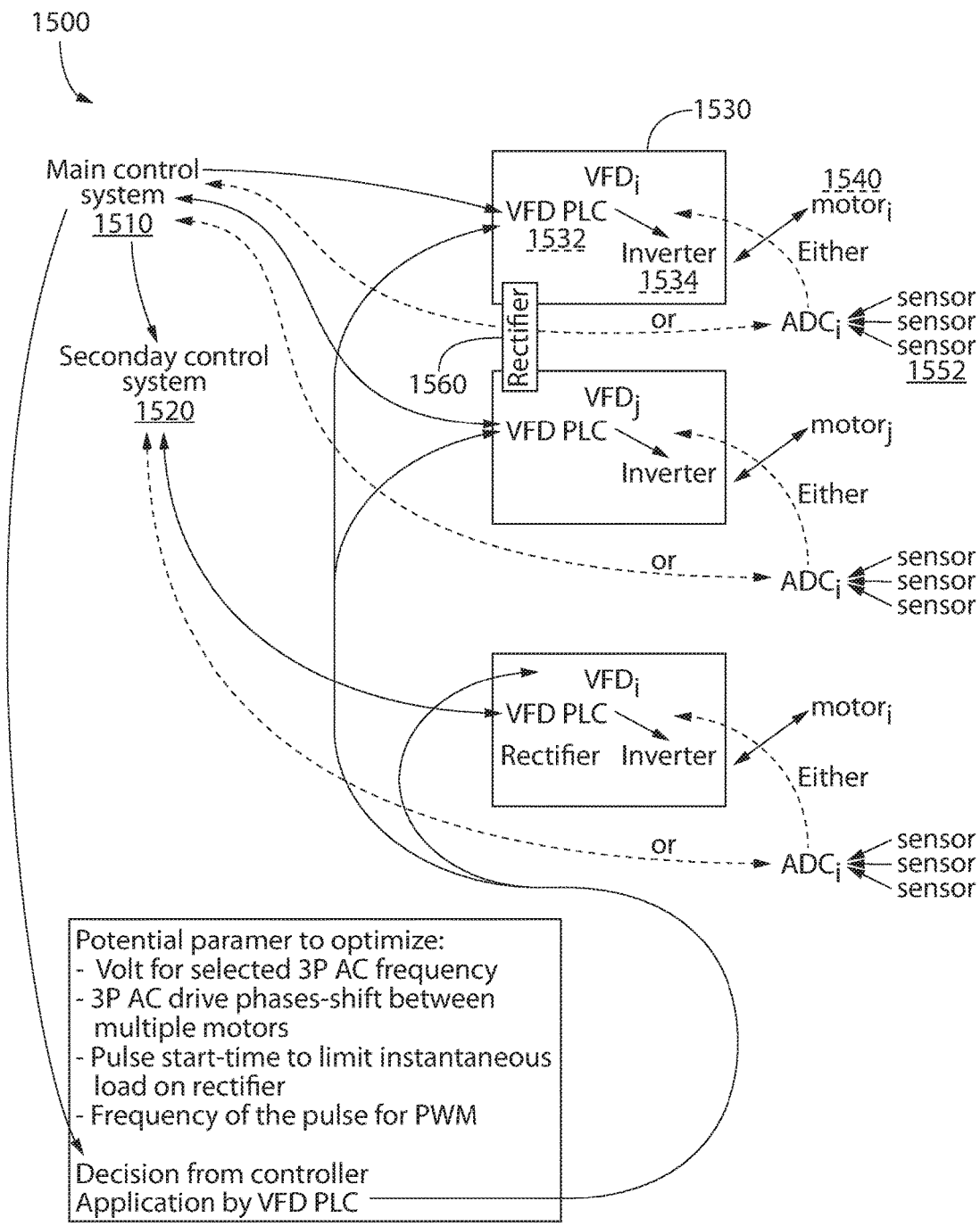
FIG. 15 illustrates a schematic view of an electronics system at the well site system, according to an embodiment.

FIG. 15 illustrates a schematic view of an electronics system 1500 at the well site system 300, according to an embodiment. The electronics system 1500 may include a main control system 1510 and a secondary control system 1520. The main control system 1510 may send signals to the secondary control system 1520 and to one or more VFDs (three are shown: 1530). More particularly, the main control system 1510 may send signals to a programmable logic controller ("PLC") 1532 in the VFDs 1530. The main control system 1510 may also receive signals from the secondary control system 1520 and the VFDs 1530.

The PLCs 1532 may send signals to inverters 1534 in the VFDs 1530. The VFDs 1530 may also send signals to one or more motors 1540 and/or receive signals from the motors 1540. One or more sensors 1552 may also transmit data to the PLCs 1532 in the VFDs 1530 or to the main control system 1510. In one embodiment, the data may pass through an ADC 1550 prior to being sent to the PLCs 1532 or the main control system 1510. In at least one embodiment, a rectifier 1560 may be part of the VFDs 1530 and/or connecting two VFDs 1530.

Figure 16:
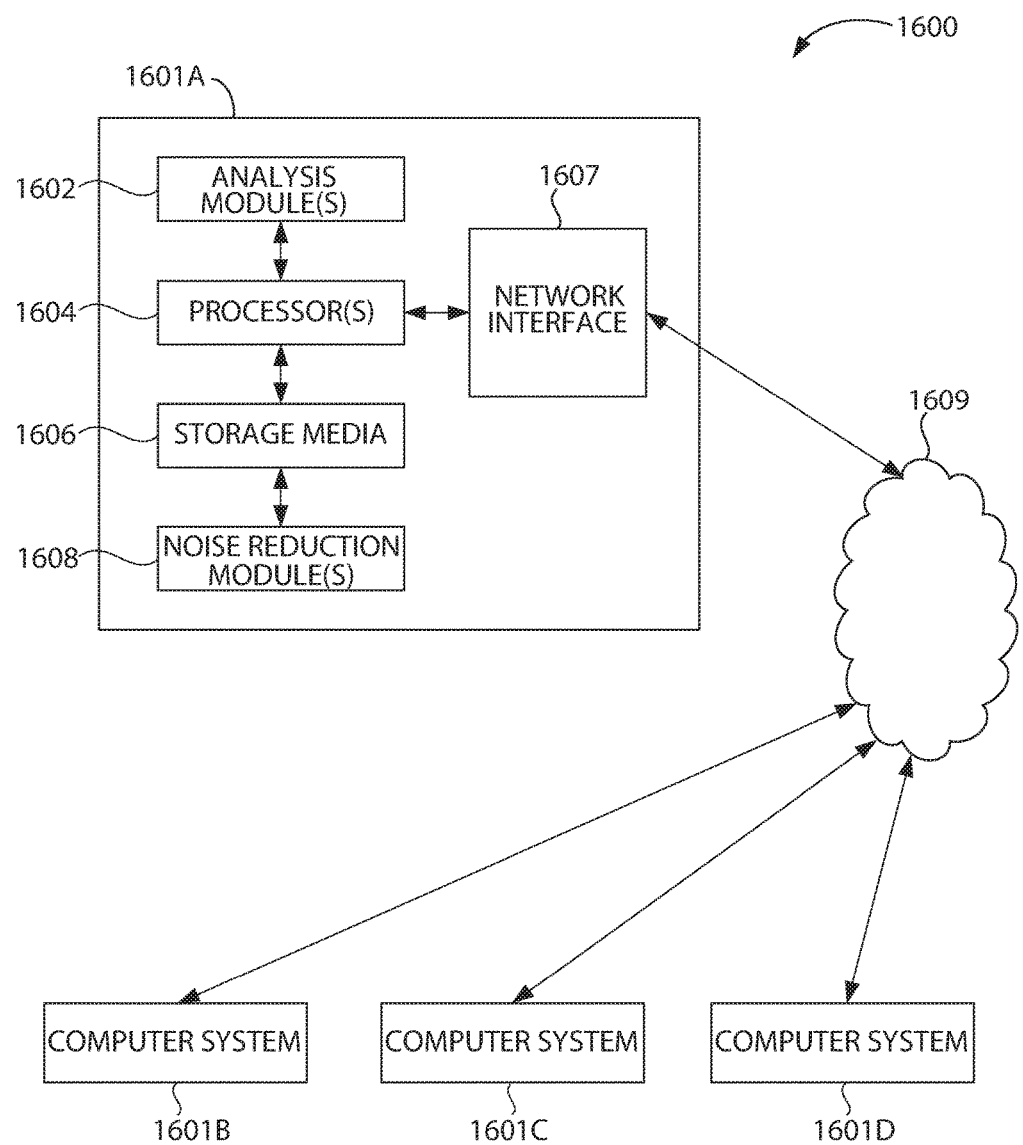
FIG. 16 illustrates a computing system for performing the method disclosed herein, according to an embodiment.

In some embodiments, the methods of the present disclosure may be executed by a computing system. FIG. 16 illustrates an example of such a computing system 1600, in accordance with some embodiments. The computing system 1600 may include a computer or computer system 1601A, which may be an individual computer system 1601A or an arrangement of distributed computer systems. The computer system 1601A includes one or more analysis modules 1602 that are configured to perform various tasks according to some embodiments, such as one or more methods disclosed herein. To perform these various tasks, the analysis module 1602 executes independently, or in coordination with, one or more processors 1604, which is (or are) connected to one or more storage media 1606. The processor(s) 1604 is (or are) also connected to a network interface 1607 to allow the computer system 1601A to communicate over a data network 1609 with one or more additional computer systems and/or computing systems, such as 1601B, 1601C, and/or 1601D (note that computer systems 1601B, 1601C and/or 1601D may or may not share the same architecture as computer system 1601A, and may be located in different physical locations, e.g., computer systems 1601A and 1601B may be located in a processing facility, while in communication with one or more computer systems such as 1601C and/or 1601D that are located in one or more data centers, and/or located in varying countries on different continents).

A processor may include a microprocessor, microcontroller, processor module or subsystem, programmable integrated circuit, programmable gate array, or another control or computing device.

The storage media 1606 may be implemented as one or more computer-readable or machine-readable storage media. Note that while in the example embodiment of FIG. 16 storage media 1606 is depicted as within computer system 1601A, in some embodiments, storage media 1606 may be distributed within and/or across multiple internal and/or external enclosures of computing system 1601A and/or additional computing systems. Storage media 1606 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURRY® disks, or other types of optical storage, or other types of storage devices. Note that the instructions discussed above may be provided on one computer-readable or machine-readable storage medium, or alternatively, may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, the computing system 1600 contains one or more noise (e.g., harmonic) reduction module(s) 1608. The noise module(s) 1608 may be configured to reduce the noise generated by harmonics, as described in greater detail above.

It should be appreciated that computing system 1600 is only one example of a computing system, and that computing system 1600 may have more or fewer components than shown, may combine additional components not depicted in the example embodiment of FIG. 16, and/or computing system 1600 may have a different configuration or arrangement of the components depicted in FIG. 16. The various components shown in FIG. 16 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A method for reducing noise at a wellsite, comprising:
   transmitting a plurality of first signals from a variable frequency drive (VFD) to an alternating current (AC) induction motor; and
   varying a timing of a plurality of second signals to control transistors in an inverter of the VFD, thereby reducing harmonic distortion of the first signals output from the VFD, wherein the timing is varied based at least partially upon an estimation of the harmonic distortion introducing clock pulses to a control system of the inverter driving the AC induction motor using a master clock system, wherein the control system operates the transistors of the inverter with synchronized pulses in relation with the clock pulses;
   performing signal acquisition using an analog to digital convertor (ADC); and
   performing data acquisition with the clock pulses using the ADC, wherein the data acquisition is performed by the ADC at a time offset in relation with the synchronized pulses are introduced to the transistors of the inverter.

* * * * *